(12) United States Patent
Lyras et al.

(10) Patent No.: US 11,294,641 B2
(45) Date of Patent: Apr. 5, 2022

(54) MICROPROCESSOR INCLUDING A MODEL OF AN ENTERPRISE

(71) Applicant: Dimitris Lyras, London (GB)

(72) Inventors: Dimitris Lyras, London (GB); Konstantinos Dimopoulos, Byron (GR)

(73) Assignee: Dimitris Lyras, London (GB)

( * ) Notice: Subject to any disclaimer, the term of this patent is extended or adjusted under 35 U.S.C. 154(b) by 526 days.

(21) Appl. No.: 15/952,650

(22) Filed: Apr. 13, 2018

(65) Prior Publication Data

US 2018/0349101 A1 Dec. 6, 2018

Related U.S. Application Data

(60) Provisional application No. 62/512,318, filed on May 30, 2017.

(51) Int. Cl.
*G06F 8/20* (2018.01)
*G06Q 10/06* (2012.01)
(Continued)

(52) U.S. Cl.
CPC ............... *G06F 8/20* (2013.01); *G06F 1/28* (2013.01); *G06F 1/3212* (2013.01);
(Continued)

(58) Field of Classification Search
CPC . G06F 8/20; G06F 1/28; G06F 1/3212; G06F 1/3287; G06F 8/35; G06F 13/4027;
(Continued)

(56) References Cited

U.S. PATENT DOCUMENTS

| 5,734,872 A | * | 3/1998 | Kelly | .................. G06F 13/4068 703/20 |
| 6,594,759 B1 | * | 7/2003 | Wang | .................. G06Q 20/401 380/277 |

(Continued)

FOREIGN PATENT DOCUMENTS

TW 275677 B 5/1996

OTHER PUBLICATIONS

Kennedy, A Multiprocessor Kernel and Monitor For Image Processing Applications Using 286/10 Single Board Computers, The University of Arizona, 1986 (Year: 1986).*

(Continued)

*Primary Examiner* — Matthew Smithers
*Assistant Examiner* — Shu Chun Gao
(74) *Attorney, Agent, or Firm* — Wiggin and Dana LLP; Gregory S. Rosenblatt

(57) ABSTRACT

A domain module computation unit has as a single board computer (1) a central processing unit (CPU) in communication with both a first bus and with a second bus with all communication between the first bus and the second bus being-through the CPU, (2) the first bus communicating with a plurality of internal modules and (3) the second bus communicating with an input/output (I/O) unit enabling communication with devices external to the single board computer. Representative internal modules include a kernel non-volatile memory, a working non-volatile memory, a random access memory and an encryption/decryption unit. The single board computational unit is configured to execute software code modeled in a form embedding data and software instructions in a single model.

40 Claims, 10 Drawing Sheets

(51) Int. Cl.
  *G06F 21/62*    (2013.01)
  *G06F 1/28*     (2006.01)
  *G06F 1/3212*   (2019.01)
  *G06F 1/3287*   (2019.01)
  *G06F 8/35*     (2018.01)
  *G06F 13/40*    (2006.01)
  *H04L 29/06*    (2006.01)

(52) U.S. Cl.
  CPC .............. *G06F 1/3287* (2013.01); *G06F 8/35* (2013.01); *G06F 13/4027* (2013.01); *G06F 21/6227* (2013.01); *G06F 21/6245* (2013.01); *G06Q 10/067* (2013.01); *H04L 63/0428* (2013.01)

(58) Field of Classification Search
  CPC ............ G06F 21/6227; G06F 21/6245; G06Q 10/067; H04L 63/0428
  See application file for complete search history.

(56) References Cited

U.S. PATENT DOCUMENTS

| | | | |
|---|---|---|---|
| 7,140,015 | B1 | 11/2006 | Bhanjois et al. |
| 8,571,910 | B2 | 10/2013 | Lyras |
| 8,627,069 | B2 | 1/2014 | Clermont et al. |
| 9,282,079 | B2 | 3/2016 | Meier et al. |
| 9,980,140 | B1 * | 5/2018 | Spencer ................ A61M 5/172 |
| 10,908,835 | B1 * | 2/2021 | Patel ....................... G06F 3/061 |
| 2003/0046130 | A1 | 3/2003 | Golightly et al. |
| 2005/0055330 | A1 | 3/2005 | Britton et al. |
| 2005/0066074 | A1 | 3/2005 | Suh et al. |
| 2006/0059465 | A1 | 3/2006 | Kogan et al. |
| 2006/0074726 | A1 | 4/2006 | Forbes et al. |
| 2006/0133586 | A1 | 6/2006 | Kasai et al. |
| 2011/0296440 | A1 * | 12/2011 | Laurich ................... G06F 21/72 719/326 |
| 2012/0191716 | A1 | 7/2012 | Omoigui |
| 2013/0061016 | A1 * | 3/2013 | Urzi ........................ G06F 21/79 711/163 |
| 2014/0330616 | A1 | 11/2014 | Lyras |
| 2015/0046631 | A1 | 2/2015 | Prather |
| 2016/0239773 | A1 | 8/2016 | Lyras |
| 2016/0328333 | A1 | 11/2016 | Dong et al. |
| 2017/0019378 | A1 * | 1/2017 | Johnson ............. G07C 9/00309 |
| 2018/0157840 | A1 * | 6/2018 | Crowley ............... H04L 9/0861 |
| 2018/0165455 | A1 * | 6/2018 | Liguori ................. G06F 9/4416 |
| 2018/0293362 | A1 * | 10/2018 | Ray ......................... G06F 21/10 |
| 2020/0219302 | A1 * | 7/2020 | Tarquini ........... H04M 1/72427 |

OTHER PUBLICATIONS

Implementation of low-power Wireless Sensor Network Protocol Stack for Real-Time Monitoring of Warehouses, Jayas, X. Zhou (Year: 2015).*
TW 107116289; Examination Report; dated Apr. 26, 2019.
Thurner, Dr. Reinhold, Implementing the Executable Model (ECM), Metasafe GmbH, Küsnacht, Switzerland, 2011.
Liedtke, Jochen, Toward Real Microkernels, Communications of the ACM, vol. 39, No. 9, Sep. 1996.
Vaughan-Nichols, Steven; Build Your Own Supercomputer Out of Raspberry Pi Boards; Linux and Open Source; May 2013.
Allan, Alasdair; Build a Compact 4 Node Raspberry Pi Cluster; Makezine.com; Sep. 2015.
European Patent Office; PCT/EP2018/063971; International Search Report; dated Jul. 2018.
Indian Patent Office Search Report dated May 18, 2020.
Michelson, Brenda M., Event-Driven Architecture Overview, Patricia Seybold Group Research Service, Feb. 2, 2006.
Breu, Ruth et al., Quantitative Assessment of Enterprise Security System, 2008 Third International Conference on Availability, Reliability and Security, Mar. 4-7, 2008; Added to IEEE Xplore May 23, 2008.
Kouns, Jake et al., Information Technology Risk Management in Enterprise Environments, John Wiley & Sons, 2010.
United States Patent and Trademark Office, U.S. Appl. No. 15/142,938, System and Method for Identifying Relevant Information for an Enterprise, Notice of Allowance, dated Jan. 25, 2021.
European Patent Office; EP 18 728 843.6; Examination Report; dated Apr. 22, 2021.
Kiepert, Joshua; Creating a Raspberry Pi-Based Beowulf Cluster; Boise State University; pp. 1-16; May 22, 2013.
Mischa, Jonker; Power Management on an ARM11 Platform; NXP founded by Philips; pp. 1-30; Nov. 7, 2008.
Wikipedia, Message Passing Interface; pp. 1-15; May 29, 2017.
Serrano, Pereira; Building a Simple Beowulf Cluster with Ubuntu; pp. 1-9; Sep. 11, 2013.

* cited by examiner

MICROPROCESSOR INCLUDING A MODEL OF AN ENTERPRISE

CROSS-REFERENCE TO RELATED PATENT APPLICATION

This patent application claims a benefit to the filing date of U.S. Provisional Patent Application Ser. No. 62/512,318, titled "Microprocessor Including a Model of an Enterprise," that was filed on May 30, 2017. The disclosure of U.S. 62/512,318 is incorporated by reference herein in its entirety.

BACKGROUND OF THE DISCLOSURE

Software is utilized to manage human interaction with computer processing units. Software appears at the human/computer interface in the form of a user interface and high level programming languages. Software enables a computer to communicate with people using different external devices such as a mouse, keyboard or video recognition system. Perhaps most importantly, software translates processing languages from human level to machine language. For example, software enables translation of a developer level language, such as Visual Basic, C#, Python, Java or SQL, to an intermediate language and then to a machine language. The ubiquitous nature of computers and their software has made the interactions with humans immensely varied. As a result, commonly used generic computers have human interaction facilities far exceeding the facilities needed for a specific enterprise application.

The complex facilities necessarily integrated into generic computers to enable those computers to interact with a wide array of diverse software and human interactions combined with a large volume of enterprise information to be processed and a plethora of software facilities make specific applications, as a whole, resource intensive slowing down processing speeds. For example, the database Language/Program, SQL/Sequel, requires a service to run and handle retrieval and storage in most enterprise software. There are several sub-steps needed for retrieval. This program, and equivalents, requires intensive programming.

Software requires frequent up-dates and up-grades to incorporate improvements and to remove processing errors (bugs). The process of up-dating or, more importantly, up-grading software is very labor and time intensive. So much so that software development expenditure is often considered to broadly consist of 50% requirements elicitation, design and implementation and 50% testing. There are few other industries, if any, where testing is such a significant part of development. The up-grade process is disruptive to development and to the broader use of software and is most acute in new paradigms of software use as in Internet of Things (IoT) and emergency response.

IoT is one of the most significant developments of software today. It consists of software and hardware components that are not necessarily managed or produced by one stakeholder. For this reason IoT is critically dependent on interoperability of IoT components that are designed and produced independently. This means that IoT components must interoperate with other IoT components during end use, without having previously been envisaged as a system. It is a widespread problem that IoT components will be found occasionally to be lacking in interoperability as a result of not being designed together. Resolving incompatibility of IoT components is accomplished by an upgrade. Upgrading via a model is an essential part of the software development disclosed herein.

Similar to a software upgrade is modifying or enhancing the functionality of software in time to obtain a benefit, such as during response to an emergency. The emerging use of software and handheld devices for intense use in complex operations requiring co-ordination, such as an emergency response, is another area where software modification is required to be more efficient. An emergency response utilizing multiple portable computing devices is time intensive and diverse in requirements so that an ability to modify software during the on-going emergency could greatly increase the odds of a successful resolution to the emergency situation. Consider how many exceptions to anticipated requirements could arise in deployment of an emergency response system. Several unanticipated use cases may become apparent during the course of a real emergency. For example, a need to identify concealed threatening persons, rather than an evacuation or lockdown, during a terrorist attack, may require a rapid software modification during the emergency. The software development disclosed herein provides unique traceability of changes so that apportionment of the upgrade process can be achieved based on which nodes of the model, including which users, and which contexts lie in the propagation path of the changes. The key to this is traceability based on modelling of propagation paths.

Similar modelling of propagation paths may be used with run-time parametrization of software rather than an upgrade.

One cause that slows down a software up-grade is a lack of traceability and evolvability of the software as a result of a lack of a traceable model to describe enterprise processes and status. Furthermore, again due to a lack of traceability, changing the software to fix last minute software bugs identified during testing before the new functionality system is ready to apply, adds significantly to the time and effort needed to up-grade. Applying up-graded compiled instructions into an existing application using conventional methods is large in volume again due to lack of traceability, such that partial upgrades cannot be relied upon to be free of defects.

Furthermore, software is exposed to illicit interjections during use commonly referred to as cybersecurity threats. The cybersecurity problem is a result of the use of layers of common and conventional software for storage and retrieval of data such that illicit agents can infiltrate a large majority of systems with the same methods.

Additionally, the performance of conventional software that does not deploy specific to use layers of software so as to avoid large generic software components, significantly affects performance and cybersecurity. The use of specific to use software improves performance significantly and improves cybersecurity significantly. As disclosed herein below, the use of one or more enterprise models significantly reduces a need for redundant software.

U.S. Pat. Nos. 8,571,910 and 10,410,156, both titled, "System and Method for Identifying Relevant Information for an Enterprise," and both by D. Lyras, disclose a system and a method for finding and retrieving information relevant to an enterprise that is relevant to enterprise problems, enterprise opportunities and unexpected or interesting events. Both U.S. Pat. Nos. 8,571,910 and 10,410,156 are incorporated by reference herein in their entireties.

One component of the system and the method disclosed in U.S. Pat. Nos. 8,571,910 and 10,410,156 is an "Overlay,"

defined therein as a software aid to find information within an enterprise. One aspect of the Overlay is its function as a relevance engine, as opposed to a search engine. The Overlay retrieves only information relevant to a particular enterprise problem or opportunity. The Overlay software locates cases similar to current problems and opportunities by locating similar process steps and similar proximity to a goal. In achieving these, the Overlay uses a model of the enterprise that is uniquely traceable and acts as an executing combination of data and logic which bypasses a need for generic and voluminous layers of software.

A glossary of terms associated with the Overlay includes:

Abstracted Context: A context that may be abstracted in the sense that it may apply to more than one domain. Abstracted context is used to define different layers of abstraction by incorporating one or more corresponding contexts in a lower level of abstraction. Corresponding means that more than one lower level of abstraction contexts are connected to corresponding associated nodes of a higher level of abstraction.

Abstracted Node Cluster: A node cluster that reflects the semantics and cause and effect logic of more than one more domain specific node cluster.

Abstracted Object: An object that may be abstracted in the sense that it may apply to more than one domain as a context delineation of a node.

Actor: A human participant in a real world process although real world processes may not be entirely distinct from system emulated processes, Attributes: Characteristics of concepts such as nodes mentioned in this disclosure, also referred to as node status. Each respective node has a single attribute value at a given time, although the attribute value will change as a result of data propagation.

Business Entity: A computer software development term used to describe a concept in the real world that is emulated in the software and having more than one attribute describing its characteristics. Anything physical, such as environment, place, physical components and people, is a context and not an attribute or a node.

Business Object: Similar to an entity it is a term used in the software industry to describe a concept in the real world that is emulated in the software.

Cases/discussions/descriptions/experiences: These are cases of experiences which may describe all or part of cause, effect, risk, and remedy. They may include generalized explanations and models for describing how things behave in the processes where they are assigned.

Cause: An occurrence or a potential occurrence that is deemed to cause an effect.

Circumstance: A broad underlying activity, a complex environment, time range or similar. In the Overlay, circumstance is similar to state and state parameters but is not a commonly used term in software engineering. It differs from state in that state also describes the instance of the situation of the node or system of nodes whereas circumstance describes more than one instance. Circumstance is also used in this text in its general English language sense when not describing node propagation paths and similar Overlay model concepts.

Cognitive structure: A structure that indexes information in a way that fits known cognitive principles.

Condition: A state of being (as defined in the English language) and sensing equipment and process help (as defined in artificial intelligence (AI)).

Context: An environment, circumstance or key identification in the domain within which a process takes place.

This can be described by the Overlay domain model and processed by the computer by defining nodes, basic environment or circumstantial information as part of their state. Context often delineates propagation paths belonging to similar but delineated processes, for example a pay-check is in the context of the appropriate crew member where the context of the crewmember defines the propagation of the pay-check to the right crewmember. Most non-activity based concepts in the Overlay are described as context. Overlay nodes cannot be anything but activities therefore the aspect of an activity that takes place in the circumstances of a non-activity concept like a place, is described in the Overlay by a context that further defines a node.

Conversion, Logical Conversion or Conversion Logic: The logic customarily found in software systems which converts one status value to another. In the Overlay, this is the logic that exists to propagate values from one node to another and to validate the conversion of value from one node to another.

Diagnosis: Finding the cause of problems and explaining interesting events or causes of opportunity.

Domain: An industry, a department of a company, an enterprise or part thereof that differs by its specific range of activities from others like it, or any enterprise structure where process steps and terminology are specific and yet practitioners understand them. Overlay models in different domains rarely affect each other. Domain differs from context in that context is more granular with practically no emphasis on activities and more emphasis on an inanimate environment affecting activities.

Effect: An occurrence or potential occurrence that is deemed to affect a process, a plan goal or a conditional goal.

Endemic Problems/Opportunities/Nodes: Problems, opportunities, or unexplained/potential/occasional occurrences, at various levels of abstraction that are considered by highly experienced practitioners to be repetitive in a variety of related processes. Endemic problems/opportunities are associated with goals since problems and opportunities cannot be defined without first defining goals.

Enterprise: Any organization or collection of organizations carrying on activities for one or more known purposes; generally characterized by predictability of goals at any one time, predictability of plans and processes to achieve those goals, and actors with substantially known values, skills, knowledge, information, endurance, and emotion with respect to goals.

Enterprise Activity: Activities recognized by practitioners in each domain or in more than one domain.

Enterprise Activity Structure: A framework of related relevance criteria that are recognized by practitioners in most domains.

Event/unexpected event/interesting event: An event is an occurrence that to a highly experienced practitioner is reasonably considered important to the enterprise and its goals.

Explanations: Explanations of problems or opportunities or unexpected events.

External Process: The external processes taking place outside the enterprise upon which some enterprise processes depend: e.g. design, construction, or education, and preparation activities that may be part of any process step; processes found to occur in the environment which are not designed to serve known goals but affect enterprise processes and goals, for example discretionary human behaviour; or processes not directly related to human behaviour, such as environmental phenomena.

Goals: Goals are nodes but due to their abstract nature often do not have sub-nodes directly assigned to them. They are often affected by nodes from more than one process cluster in a system depicting in the Overlay that goals may have many sources of contribution Goals or Conditional Goals: The goals and conditional goals for which an enterprise process has been designed.

Goal Proximity: The proportional effect of subordinate nodes on dependent nodes when nodes are connected by cause and effect in a node cluster. Usually goal proximity is the proportion of cause and effect of subordinate or causal processes on dependent or affected processes.

Highly Experienced Practitioners: People who have been participating and have been responsible for a process for which they are considered highly experienced for most of their careers and are aware of the particular process and its main characteristics, and are also aware of the processes dependent and subordinate to the process for which they are considered highly experienced.

Inanimate Process: A process that does not involve human intervention (such as a chemical process) and therefore may not have goals other than the goals of the process within which it has been designed by humans to be a part. For example, corrosion is an inanimate process that is predictable and well known, but nevertheless would not be considered a goal-based process.

Layer of Abstraction Model: The Overlay can be described as model of enterprise activities at one or more levels of abstraction. Layers of abstraction can be: A) node clusters with many semantically identical nodes delineated by parallel propagation paths in different contexts that do not converge between the layers in different contexts and may converge between layers in different contexts at some node that is downstream in propagation; B) Layers of abstraction can also be semantically similar but not usually identical nodes in clusters in parallel propagation that do not converge and where nodes at different levels of abstraction correspond to each other by similarity of semantics and logic; and combinations of (A) and (B).

Logic Template or Logic Abstraction: An increment of reusable logic placed between nodes in the Overlay model. The emphasis on abstraction of logic plus the abstraction of node semantics greatly assists in developing Overlay models that can be compared for similarity which has many benefits.

Microkernel: A near-minimum amount of software that may provide the mechanisms needed to implement an operating system. These mechanisms usually include low-level address space, thread management and inter-process communication (IPC). An exemplary application of a microkernel is disclosed in U.S. Pat. No. 9,282,079, "Microkernel Gateway Server," by Meier et al. that is incorporated by reference herein in its entirety. The U.S. Pat. No. 9,282,079 patent discloses a gateway server having a first subsystem that receives data from an unsecure network, such as the Internet, and a second subsystem that transmits the data to a secure network. An IPC controller and a microkernel are disposed between the first and second subsystems. All communications pass through a memory controlled by the IPC controller/microkernel combination. Code within the microkernel determines which data is safe to pass through to the second subsystem. The use of a microkernel is significant to the operation of IoT, emergency response systems, high performance compact systems, IoT, and many other important uses.

Node Status Value: The value associated with a node that changes as the system is supplied with fresh data. Node status value changes often and is associated with changing data in a system. Time stamp accompanies node status value but is considered a state parameter in software engineering. Many state parameters accompany node status value of each node, of which context is the most important for modelling purposes.

Non-Goal Based Animate Processes: Processes that people experience but are not clearly goal based such as appreciating a certain type of music or liking a certain color. A common word for this is discretionary.

Non-volatile memory; Computer memory that can be sustained without power.

Object: An object in the domain which is an important part of a process delineating an environment in which the process takes place and is represented as a context further identifying a node, in the Overlay. This can be described by the Overlay domain model and processed by the computer by accompanying nodes with information regarding their state. An object can be tools of different types such as different types of materials involved in a process that may affect the process propagation path.

Opportunities/Successes: In the present disclosure, opportunities and successes are considered nodes within processes or can be nodes representing goals where highly experienced practitioners reasonably expect opportunities and/or successes.

Organize: To be an abstraction of, to generalize, to group or model.

Ossified: A property of an entity within the enterprise activity model which varies but is considered constant, because practitioners expect the property to be fairly constant and predictable.

Overlay Model: one or more node clusters explaining the relationships between elements in a system and able to illustrate status value state or circumstance propagation graphically or in a traceable depiction. A graphical representation or easy to trace depiction of the workings of a system where the constituents in this disclosure nodes are related to each other and all other elements related to nodes are related to each other via the nodes.

Plan: A less well-defined process where the steps in the process are ordered in a way fitting current circumstances. The goal hierarchy of plans is often different from the underlying processes they incorporate.

Practitioners: People who have average experience in the enterprise.

Predictive Pattern: Software or hardware node cluster or software module using data and logic to identify patterns in non-Overlay node and primarily external data and introduce them to the Overlay, such as in text in external repositories and data in external data models. It is used by the Overlay model for exchanging data and text with external systems. It may contain Business Intelligence (BI) logic, pattern recognition or similar logic.

Primary means of understanding more about the problem or opportunity: The methods by which the most appropriate relevance is determined about a problem or opportunity.

Problems/Failures: Problems and failures are nodes within processes or can be nodes representing goals where highly experienced practitioners reasonably expect problems and/or failures or unexplained phenomena or phenomena of unexplained cause and effect. Problems and failures, opportunities and successes, stress points, goals are all considered nodes.

Process: A set of activities serving a set of goals and conditional goals. These can range from ossified processes, to established processes, to newly established processes, to plans that are processes yet to be put in practice.

Process Nodes: Parts of processes where highly experienced practitioners expect noteworthy outcomes and information such as problems and opportunities.

Processing Power: The processing power of a hardware component of a processor in terms of the speed at which the processor can process units of processing work.

Propagation; The change in node values that develops along a series of connected nodes by having node values connected by logic that is set up to transfer new values along the path of propagation and execution. Different context for an otherwise same node delineate different propagation paths.

Relevance Criteria: Ways of expressing relevance which help build the enterprise activity model or structure. The relevance criteria is determined primarily by the node and its state including context and the logical links between nodes plus the links of similarity between nodes in different layers of abstraction. Relevance criteria can also include aspects of the cognitive structure that is assigned to nodes such as roles, users, workflows, actors and other concepts that help practitioners determine relevance. Relevance criteria can also be presented by node clusters configured in specific ways.

Risk: A potential effect. This can be positive when it corresponds to an opportunity or negative when it corresponds to a problem.

Role: Stakeholder of the process being emulated in the system. This usually means the role is a stakeholder of the computerised emulation of the process and is not necessarily an actor in the corresponding real world process. Roles are related to which process emulations a system user is able to see and has authorisation to access.

Root Cause: An occurrence or potential occurrence that is deemed to be the reason a cause has occurred.

Script: A process that is performed consciously or subconsciously because it has been ossified.

State Model: A model of data collected in a system.

State Parameters: Circumstances surrounding a node including context and the time of change new status value. State parameters accompany nodes and each node has its own state parameters. The main state parameter is context but other state parameters may exist. In software engineering terms state parameters are anything that defines how change in a system or its constituent is defined within the system. Example of State parameters and status of a node would be; Node; "transfer monthly pay to crewmember" Context "crewmember", actor Context; "'MoneyGram", status; date of payment "5-12 2017", Timestamp of Status "'5-12-2017", Role1) payroll officer, Role 2); Crewmember.

In a similar example; Node; "transfer monthly pay to crewmember" Context "all crewmembers", node status; "'At risk of not being paid on time", Timestamp of Status "'1-1 2018", role 1): Payroll officer, role 2); fleet manager.

There can be many context per node and this is the main state parameter but not the only parameter that defines the circumstances. Status is accompanied by a timestamp. All circumstantial depictions besides the actual node status value can be considered state. Status value may also depict state under specific circumstances.

Superimposed Nodes and Corresponding Underlying Nodes: Superimposed nodes are a type of node that is accompanied by an underlying node. Superimposed nodes are nodes which occur in the circumstances of other nodes (underlying nodes). Both superimposed and underlying nodes are activities and not environments. The difference between these nodes and other activity nodes which are context specific, is that the underlying node is an activity and has more than one propagation path to other nodes that are mostly not in the same node cluster as the superimposed node. In the case of a context of a non-superimposed node, the context itself is not an activity and is a delineation of a node that is specific to an environment. Context delineations of nodes also do not logically link to other context delineations of other nodes unless the nodes they are assigned to are logically linked.

An example of a superimposed node is legal dispute superimposed over an underlying node which could be a business process about which the legal dispute pertains. Similarly a pricing or paying process can be about an underlying business process like a repair. Superimposed process propagation is not directly related to underlying process propagation, but is delineated by the underlying process and follows a different propagation path than that of the same superimposed process with other underlying nodes. For example, the same superimposed process of pricing or paying which could be about a transportation process and not a repair process and would follow a different propagation process for pricing or payment purposes for transport than for the repair process.

Traceability: The ability to view the changing values of nodes along the paths of execution of the logic between nodes in a series.

Upgrade: An ability to change and implement changes of nodes and/or their positions in node clusters and links to other nodes and/or change the logic that connects nodes and/or change the state of nodes thus changing the machine readable behaviour of the system. Conventional software upgrading normally involves changing entity relationships and/or changing attributes of entities and/or changing conversion logic.

Volatile memory: Computer memory that needs power to be sustained.

BRIEF SUMMARY

Disclosed herein is a system and method for embedding data and code from at least one layer of abstraction model, on a semiconductor chip (microprocessor). Embedding the code on the chip enhances performance significantly, perhaps 1000-fold, as compared to when storage software uses a generic storage and retrieval language, such as SQL, and when there is a separate domain processing code on a separate server. Embedding the code on the chip improves both performance and security over conventional distributed server processing.

Advantages of the at least one layer of abstraction model, embedded in the chip include a much reduced time to prepare new software logic and new data compared to conventional multiple attribute entries and separate code.

DETAILED DESCRIPTION

Figure 1:
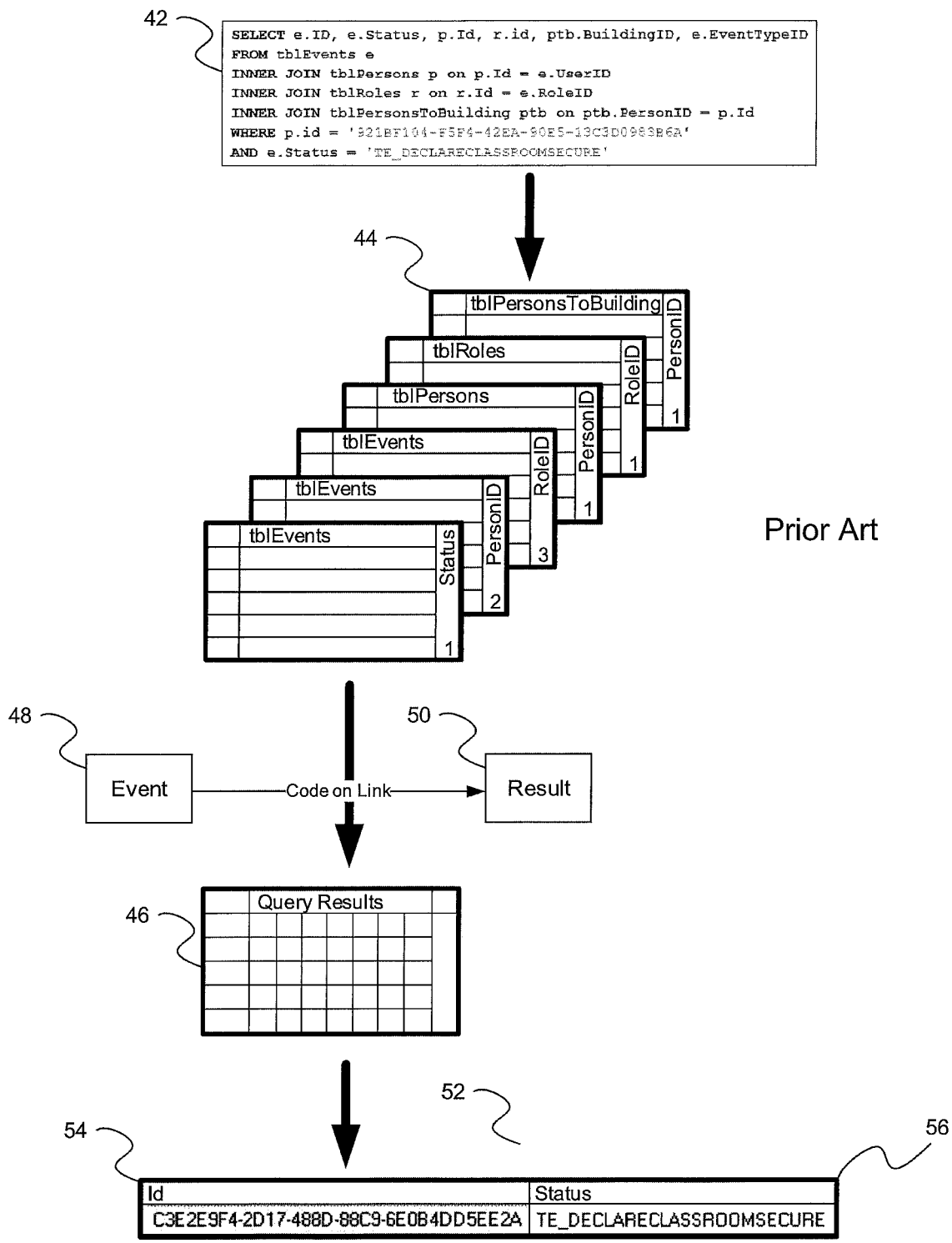
FIG. 1 illustrates operation of conventional software code as known from the prior art.

As enterprise systems used on small portable computing devices, such as smart phones and tablets, evolve, there will be a need to work off-line and, at times, in arduous conditions where communication with a central coordinating computing facility is not continuous. This requires that the small portable computing devices operate with considerable software capabilities in an off-line state. This in turn requires that these computing devices have an enterprise software application partitioned to suit the users and the devices. This in turn requires data model partitioning because the small computing devices will not be able to store or process a copy of the entire enterprise data model. Partitioning of an enterprise system to suit changing current circumstances requires a unique enterprise model that can be partitioned in a large variety of ways that may not have been foreseen at design time.

Disclosed herein are:

(1): Methods for making processors and storage more enterprise application specific increasing processing efficiency and reducing vulnerability to cyberattacks;

(2): Resolving software incompatibility between IoT components and componentized software by enabling traceability of logic within systems and between systems of different design origin and by abstraction of semantics and logic between disparate systems which need to expose their logical workings for purposes of interoperability, compliance purposes, co-ordination purposes etc. This helps manage the vast potential problem of software compatibility when the systems have no overarching stakeholder; and (3): Fast modification of software to adapt to unforeseen changes of an on-going emergency situation. This is a remedy to the incompatibility of IoT or other software components developed independently and remedies the problem of software needing modification while in use. Also provides redundancy in circumstances where the hardware used in emergencies is subject to attrition. "Fast" is conventionally referred to as a timeframe for the system to be reinstated or up-graded during an emergency.

The enterprise data model is divided at a late stage of design and implementation. Components of the data model are applied to different stand-alone processing and storage units. This division of the data model enables these stand-alone processing and storage units to work independently when off-line as well as in collaboration with a central enterprise model when on-line. The ability to divide the data model to suit the situation in turn offers the benefit of allowing occasionally off-line systems to be tailored to the roles and the situation that are envisioned.

The advent of cost effective methods of manufacturing computer boards using a commercial central processing unit (CPU), memory, dedicated devices (such as WiFi, proximity sensors, accelerometers, etc.) brings new opportunities to developing compact high performance and secure hardware/software combinations. The development of such a computer unit requires a new software development process.

The Overlay offers unique advantages in the independence of processing units, the interoperability of independent processing units and the upgrading of software in the advent of IoT and Ecosystems in the cyber sphere, the recovery of enterprise systems when one or more processing units have been rendered inoperable and the reorganization of computational facilities when stakeholders change. In this respect, an Overlay based model can be used to denote the dependencies, requirements or constraints between different configurations of IoT devices. Any violation of such dependencies, requirements or constraints would constitute a threat to or breaking interoperability. For example, the Overlay model may denote that IoT device A requires ASCII input and is depended on input from IoT devices B and C. Here a violation seen at run-time between output/input data formats from IoT device B or C to IoT device A would constitute interoperability violations. This is made possible because the Overlay modeling allows for separation of concerns by way of a collection of clusters of nodes and their respective states connected by logic. In this example this cluster of nodes would be denoting, what each IoT device does or requires for itself as an independent unit.

In order to understand the operation and benefits of the proposed Overlay model, we briefly consider the operation of conventional software code. FIG. 1 illustrates the operation of conventional software code as known from the prior art. A piece of software code 42, written in any software language, typically stores, modifies and retrieves data using tables 44 in a Relational DataBase Management System (RDBMS) like SQL. In alternative exemplary embodiments, other database management systems (e.g. noSQL) and other data structures may be used for data handling. Tables 44 may contain data relating to e.g. persons (tblPersonsToBuilding), roles (tblRoles), events (tblEvents), etc. Each table has an associated identity value like PersonID, RoleId in the above example. This identity value acts as a "key" for identifying and matching data across tables and allowing, for example, to locate information, actions and events related to a particular person. To achieve this functionality the same key may be used in more than one database table.

A software code 42 may thus use SQL queries to retrieve the records of data from the RDBMS 44. These data are also kept in one or more query result tables 46 and are then manipulated by algorithms implementing business logic (i.e. software code) depending on the desired process (i.e. user action).

The above approach is routinely used in modern software to achieve the following tasks:

Retrieve the required information;
Read data on retrieved information;
Assign data to algorithm variables;
Execute the corresponding code validation part for the particular use case of interest; and Refer to a reusable stored procedure (i.e. software code) for executing an event 48 (i.e. a User Action, e.g. "Lock Door") associated with a result 50 (i.e. Event Status, e.g. "Door Status").

One problem with such a prior art software structure and operation (i.e. a non-modeled software code) is that such a code cannot identify the context of attributes since it is impossible to attach context to selected data points. This is better understood by considering a part of an example event table 52 that stores an event using its "Id" 54 and its state "Status" 56. No other information that can be used to identify the context of the event or its attributes is stored or associated with the event.

Such a prior art coding model can join two attributes in one stage of propagation but cannot connect more than one stage of propagation because the code is structured in at least two parts, a data retrieval part and a propagation part. Neither part contains metadata that could allow distinguishing the state of an event (or node) and thus the node's relevance and association to other events (or nodes). Furthermore, and more importantly, neither the data model nor the data retrieval mechanism provides sufficient state information to each event (or node) to allow the propagation paths to be recognized by the system in the form of a cause and effect model.

This characteristic of the prevailing software coding methods, like the one illustrated in FIG. 1, limits the functionality of the code in modern enterprise and critical use scenarios where versatility is needed in order to cater for continuously changing situations, system architecture, parameters etc. These changing environments and conditions require the use of software that can be adjusted, reconfigured and upgraded in time to obtain the benefit while still running in complex systems which are also in continuous hot reconfiguration (i.e. while operating).

Figure 2:
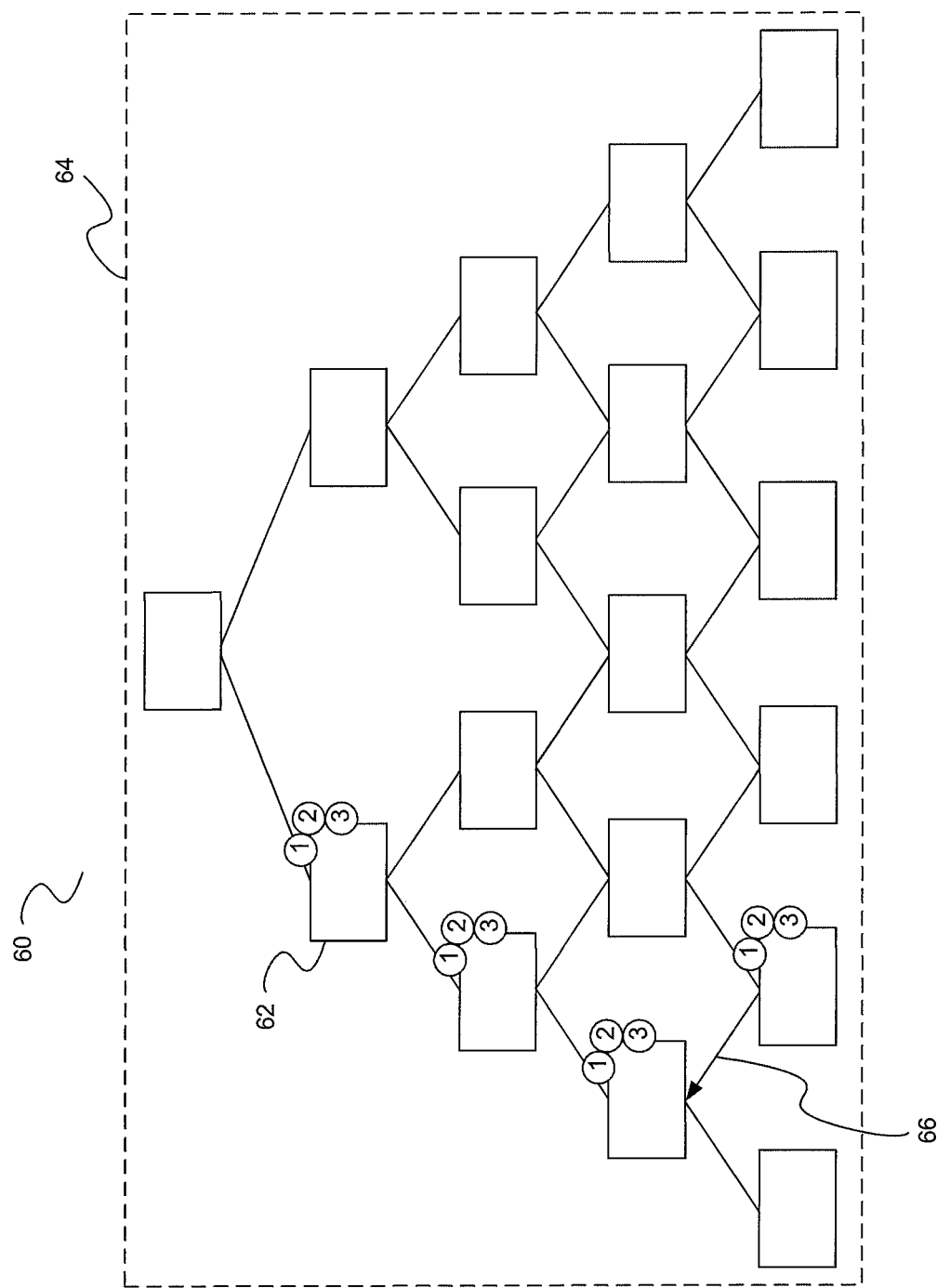
FIG. 2 illustrates operation of software code using an at least one layer of abstraction model.

To overcome the limitations of the software model of FIG. 1 the present Overlay model is presented. FIG. 2 illustrates the operation of software code using the Overlay model 60. Overlay model 60 uses the notion of nodes 62 which represent problems/failures and opportunities/successes within processes in an enterprise (or other) environment. Nodes are connected to each other in a node cluster 64. Each node 62 retrieves its value from a file and does not require a retrieval query in a database system, which query would need to run at runtime.

In the Overlay, all information is part of the model so each node calls its own information by way of status values. Unlike prior art, there is no need to run queries on an external data model, so the computer readable coded logic embedded in the Overlay model lacks any retrieval aspect to an external data model and does away with the discontinuity in the computer readable logic to accommodate retrieval. Prior art code cannot be a model because the retrieval process and logic is adjacent to conversion logic and thus is very difficult to trace one conversion and its data to the directly following conversion and its data. That is, the code cannot be a continuous model because it is interrupted by retrieval queries which in turn are not precise depictions of status and state of the nodes being processed by the code, and therefore cannot link one stage of propagation to the next to form a model.

To ensure data unification and integrity the Overlay uses the location of nodes and their state, and the logic between nodes to unambiguously define relevance between nodes. The location of nodes adjacent to computer readable logic and connected to other nodes as in FIGS. 3a 3b and 3c allows an enterprise model expressed using Overlay nodes and their criteria to be used to compare to other data models such as entity relationship data models and similar models and to verify the semantics and relevance of data in such models by comparing identical nodes in the Overlay with nodes in the entity relationship model. This in turn may help highlight duplicated information in such entity relationship data models and help outline the flow of the logical conversions in the coded logic. There are several benefits to this expression of conventional data modes and code in Overlay terms, some of which are discussed elsewhere herein.

The location of the stored value in the storage mechanism or cache is determined exclusively by the overlay model via the node and links that indicate relevance of one node and its state (context) to another node and its context.

In an embodiment each node gets its value to pass to the runtime mechanism from a non-volatile storage mechanism or from a volatile memory cache. In one aspect these links and states may be stored in a file containing all the nodes of the Overlay model. In another aspect there is a storage file for at least one node, where each of these files is connected by a path of the corresponding node. Therefore the system and its users can select nodes for processing at run time, for example, via the node ID which can retrieve values directly and unambiguously The use of nodes 62 and node clusters 64 is enough for the Overlay model 60 to describe any enterprise (or other) environment. Each node link 66 contains software code that changes the value of the affected node (i.e. target node) without the need to include any location retrieval logic (i.e. avoiding accessing database tables), thus speeding up operation and facilitating model rearrangement. Node links have a specific direction of data/state propagation like node link 66.

The Overlay model 60 describes the state of an event using context related to the event as a major part. By means of example, we may consider which "building", which "role", which "person", etc., accompany each node 62. Furthermore, each node 62 has a status value. As a result node status and node state are visible in the Overlay model 60 and accompanied by adjacent code in the links 66 between nodes 62. This characteristic of the Overlay model 60 allows traceability of nodes 62, node states, and the underlying cause and effect relationships between nodes and, therefore, of the relevance of nodes with respect to each other. This characteristic, in turn, allows the accommodation of node rearrangements, additions and deletions, which reflect real-life changes, such as enterprise-related changes without losing human or machine traceability of the changes.

Overlay and its relationship with programming languages in general; The Overlay model represents status values for each node, state for each node by way of context to delineate propagation paths based on context, and logic to convert one node status value to an affected node status value. The affected node being compatible in context and other state parameters. Since each node in the Overlay has state parameters described within the model and each node is provided with state parameters, the status values and the conversion logic are the remaining components that needs to be converted to a language understandable by the operating system. The state aspect is handled by the model itself and does not need to be converted to a language understandable by the operating system.

So, for example, when executing on a Linux or similar environment, the status values and logic presented in the Overlay are converted to Linux or similar code. The same can happen for other programming languages and environments, such as Microsoft.net, or any higher or lower level programming language.

In other examples, the Overlay is not used for processing but only to convert from a model to any programming language. This may be useful for example to convert an Overlay model that has many traceability and abstraction features described in other parts of this disclosure, to a system or environment that cannot process the Overlay model itself but can process only specific code. Smart contracts, for example, are a form of software development which often dictates the language upon which software is executed. For example Solidity is a language utilised by the Etherium smart contract environment which in turn is associated with Blockchain. So in an embodiment, the Overlay modelling method can be used to build software for a multitude of environments for example for IoT devices where the Overlay lends traceability and many related advantages while associated smart contract transactions related to the IoT devices can be executed in Etherium, by converting the Overlay model to Solidity code.

In this case, information such as state parameters, instantiation parameters and the data model also needs to be passed to the underlying operating system because the Overlay model is not utilized to process the Overlay model but the entire model is converted to an appropriate language such as Solidity. The process of conversion is the process of model driven engineering and the Overlay can be used for modelling and converted to one of the software languages mentioned above for processing. This enables modeling of software in the Overlay that is then converted to a language like Solidity so that Overlay models can be converted to domain or other development specific language environments.

In another example the logic development in the Overlay is templates and abstractions of logic. Overlay logic can be developed into templates of abstracted logic. Templates help Overlay developers to develop much faster and with less effort and errors. They also help in abstraction of layers of the Overlay by allowing comparison of logic between nodes in different layers of abstraction by comparing templates. The combination of node abstraction and logic templates in turn helps in many ways mentioned elsewhere in this specification especially in drawing similarities via abstracted layers and in monitoring disparate systems and their functionality for compliance to needs and to regulations. One special aspect of templated logic is goal proximity but there has been much templated logic used regularly in software development although this has included relation data model queries and other aspects of conventional coding not used in the Overlay to avoid opaque traceability.

The Overlay model can be used as a conceptual model and also to execute on live data. The ability for the Overlay model to execute on live data has been described herein. The importance of conceptual models capable of executing on live data is also described herein. A published paper, *Implementing the Executable Conceptual Model (ECM)*, by Dr. Reinhold Thurner, Rebweg 21, CH8700 Küsnacht, Switzerland explains the challenges and describes an alternative method.

Abstraction in the Overlay Model

Figure 3A:
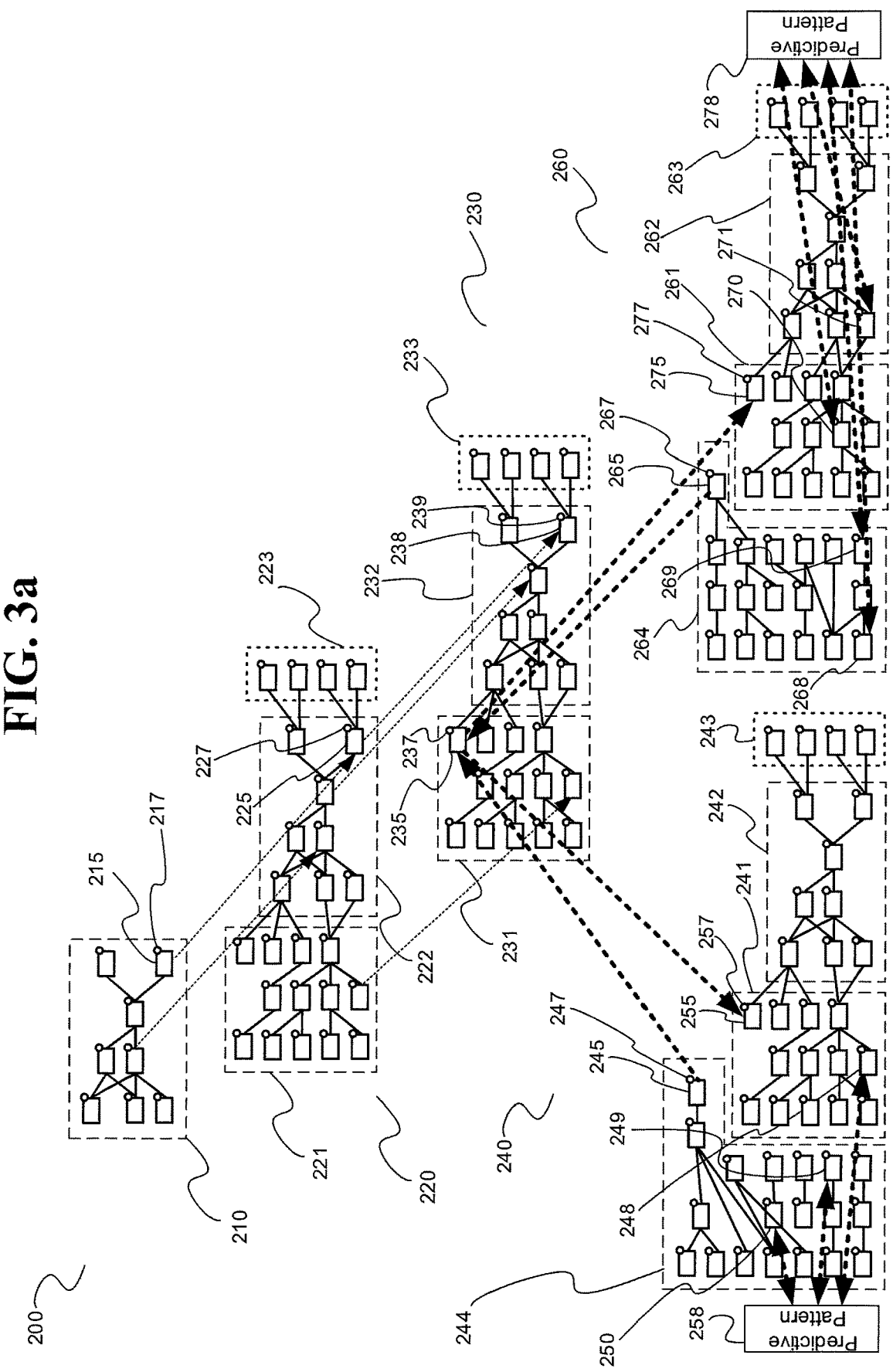
FIG. 3a illustrates use of abstraction layers to determine similarity of nodes in a first embodiment of the at least one layer of abstraction model.
Figure 3B:
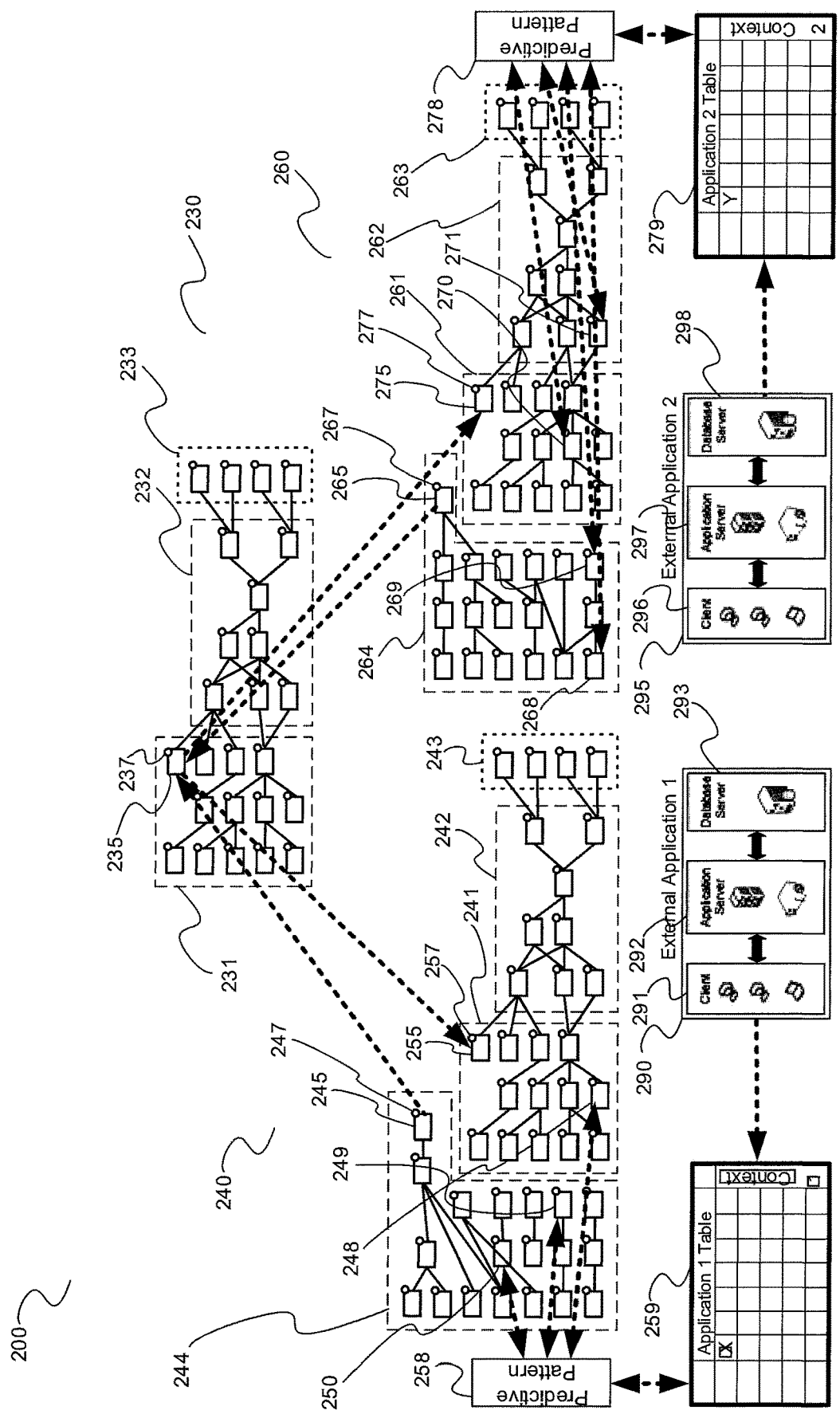
FIG. 3b illustrates an extension of the at least one layer of abstraction model, of FIG. 3a to external applications.

The Overlay can be described as a model of enterprise activities at one or more levels of abstraction. Layers of abstraction can be; A) node clusters with many semantically identical nodes delineated by parallel propagation paths in different contexts that do not converge between parallel context delineated propagation within that cluster and may converge at some node that is downstream in propagation. B) Layers of abstraction can also be semantically similar nodes in clusters in parallel propagation that do not converge between layers and where nodes at different levels of abstraction correspond to each other by similarity. There can also be Combinations of (A and (B in an Overlay. FIGS. 3*a* and 3*b* illustrate the use of abstraction layers to determine similarity of nodes in the Overlay model. By means of example we consider the scenario of an enterprise model representing enterprise operations, enterprise processes, their status and state, as well as opportunities, risks, etc. Looking at an exemplary embodiment of the entire Overlay model 200, we see that it is broken down into a number of layers of abstraction, each layer conveying various amounts of detail. At the highest level of abstraction 210, we find a cluster of abstraction nodes, which cluster represents operations of high consequence for the enterprise, like operations relating to a large variety of vertical businesses, including construction, manufacturing, and marine transportation. Each node, like node 215, represents a problem/failure or opportunity/success (e.g. high consequence collateral damage) and is associated with a context 217 (e.g. multi vertical enterprises). At this level of abstraction a general goal is described (e.g. manage high consequence process) and few process details are included.

Moving to the second level of abstraction 220, a more detailed cluster of nodes is defined providing more detailed goals (e.g. load/discharge any tanker vessel). The cluster 220 is divided into sub-clusters 221, 222, 223. Node 225 in cluster 222 is associated with a context 227 (e.g. all types of tanker vessels) (similarly for all other nodes of the second level of abstraction 220) and is directly linked with node 215 of the higher (highest in this case) level node cluster 210 (1-1 link between nodes).

Cluster 222 contains more senior level goals and contexts for which we can assign details 221, 223 as a result of being at a lower level of abstraction thus more domain specifically defined compared to multi-vertical enterprises.

In an alternative exemplary embodiment, nodes of a higher level of abstraction may be directly linked with more than one node at a lower level of abstraction (1-to-N link). This may be the case at any level of abstraction.

Moving towards less abstraction to the third layer 230 (which is divided in sub-clusters 231, 232, 233), a more detailed cluster of nodes is defined providing more detailed goals/processes (e.g. discharge tanker class A vessel). Node 238 in cluster 232 is associated with context 239 (e.g. tanker class A vessel) and is directly linked with node 225 of the higher (second layer of abstraction) level node cluster 223. This level of abstraction 230 may contain more detail compared to the higher level of abstraction 220. In the present illustration, this higher level of detail is not shown for simplicity and ease of visualization.

One layer below, is the fourth layer of abstraction 240, which is the layer containing the underlying model of a first application performing a first task (e.g. discharging specific tanker class A vessel with a first application software). The model of the first application in cluster 240 may be divided into sub-clusters 241, 242, 243, 244. Node 245 in cluster 241 is associated with a context 247 (e.g. tanker class A vessel type X1) and is directly linked with node 235 of the higher (third layer of abstraction) level node cluster 232 for transmitting data to the higher level cluster 235. Cluster 241 contains more detail compared to cluster 231, where cluster 231 belongs to a higher level of abstraction. Node 255 in cluster 241 is associated with context 257 (e.g. tanker class A vessel type X2) and is directly linked with node 235 of the higher (third layer of abstraction) level node cluster 231 for receiving data from the higher level cluster 230.

Other nodes 248, 249, 250 in fourth layer of abstraction 240 are connected to a predictive pattern module 258 that contains software code that associates nodes 248, 249, 250 with attributes in external application 1 data table 259 (FIG. 3*b*). Predictive pattern module 258 also extracts the context from the appropriate columns of data table 259 and passes it to corresponding context labels of nodes 248, 249, 250, respectively. In alternative exemplary embodiments, predictive pattern module 258 exchanges information (e.g. text and/or other data) to external systems and may also contain business intelligence logic to identify patterns (e.g. in textual data).

External application 1 data table 259 is created by external application 1 290, which application 1 contains, in an exemplary embodiment, one or more client devices 291 (e.g. desktop or portable computing device or IoT device, including smart phones) in communication with an application server 292, which application server 292 is also in communication with a database server 293.

The fourth layer of abstraction may also contain the underlying model of additional applications, like that of a second application performing a second task (e.g. discharging specific tanker class A vessel with a second application software), at cluster 260. Cluster 260 may also be divided into sub-clusters 261, 262, 263, 264.

Node 265 in cluster 261 is associated with a context 267 (e.g. tanker class A vessel type Y1) and is directly linked with node 235 of the higher (third layer of abstraction) level node cluster 230 for transmitting data to the higher level cluster 230. Cluster 264 contains more detail compared to cluster 230, where cluster 230 belongs to a higher level of abstraction. Node 275 in cluster 262 is associated with a context 277 (e.g. tanker class A vessel type Y2) and is directly linked with node 235 of the higher (third layer of abstraction) level node cluster 230 for receiving data from the higher level cluster 230.

Other nodes 268, 269, 270, 271 in fourth layer of abstraction 240 are connected to a predictive pattern module 278, which module contains software code that associates nodes 268, 269, 270, 271 with attributes in external application 2 data table 279. Predictive pattern module 278 also extracts the context from the appropriate columns of data table 279 and passes it to corresponding context labels of nodes 268, 269, 270, 271, respectively.

In alternative exemplary embodiments, predictive pattern module 278 exchanges information (e.g., text and/or other data) to external systems and may also contain business intelligence logic to identify patterns (e.g. in textual data).

External application 2 data table 279 is created by external application 2 295, which application 2 contains, in an exemplary embodiment, one or more client devices 296 (e.g. desktop or portable computing device IoT device, including smart phones) in communication with an application server 297, which application server 297 is also in communication with a database server 298.

The purpose of connecting nodes 245, 255 of fourth abstraction layer 240 and nodes 265, 275 of cluster 260 with node 235 of third abstraction layer 230 is for integrating attributes stored in tables 259, 279 through a data translation operation. As explained, this is facilitated by predictive pattern modules 258, 278.

In the exemplary embodiment of FIG. 3*a*-*b* a node of a higher level of abstraction may be directly linked with a node at a lower level of abstraction (1-to-1 link) where the location of the two nodes is associated by means of similarity in the corresponding clusters of nodes. In other words, if we consider that a lower level of abstraction is in essence similar in semantic terms and in similar in cause and effect logic as a higher level of abstraction, but enriched with additional detail nodes, nodes in the higher level of abstraction and nodes at the corresponding part of the lower level of abstraction are directly connected by similarity as distinct from cause and effect. This is not illustrated except for a few similarity connections between abstraction layers in FIGS. 3*a*-*b* for simplicity purposes.

Figure 3C:
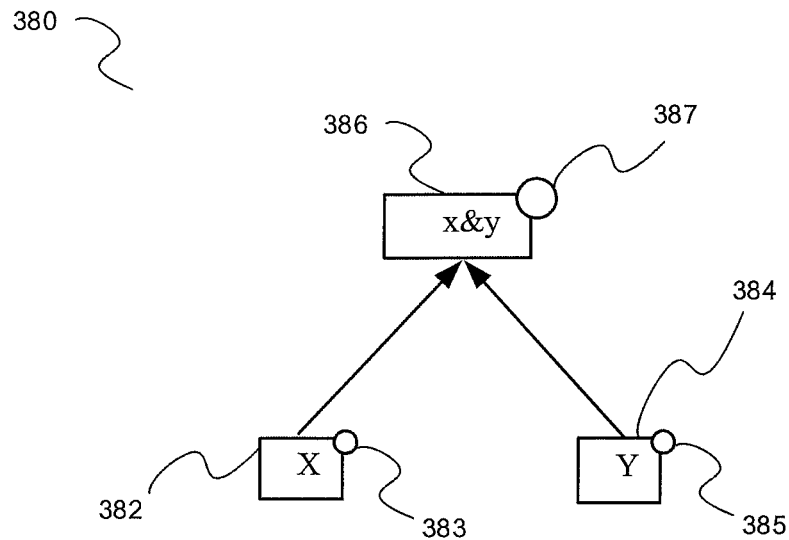
FIG. 3c illustrates a data translation operation.

FIG. 3*c* illustrates a data translation operation 380. Integration model 386 can be visualized by connecting application 1 model 382 (associated with context 383 and containing data "X") and application 2 model 384 (associated with context 385 and containing data "Y") to form combined integration model 386 (associated with context 387 and containing data "X & Y").

The disclosure accompanying FIG. 3*a*-3*c* explains how by splitting the Overlay model into several levels of abstraction and detail and using the traceability of the model by combining data and logic in the same model, one can trace underlying applications for common functionalities. It is possible to integrate all these notions into an explicit model that also describes the underlying functionality. The underlying functionality can be abstracted because one can trace the semantics and exact state of each attribute in the layers below (i.e. the layers of higher detail) and apply logic to the abstracted layer that follows the logic of the layers below. This is a benefit of the Overlay model as it cannot be done with conventional conceptual models and neither with conventional non-modelled software, because in conventional programming and models, state is not defined for each attribute and the logic is not purely defining machine readable relevance (as in the Overlay model). Instead, logic in prior art includes retrieval of many attributes that do not resolve to adequately identify source nodes in a continuous model. Prior art logic also includes implied but not explicitly modelled state. Conventional logic also includes conversion logic that cannot be readily abstracted for modeling purposes because it does not involve any attribute semantics.

There are several related reasons beyond abstracting the logic, as to why prior art Entity Relationship modelling and separate logic cannot be abstracted in the sense described herein. One reason is that in prior art the data model does not individually define or differentiate attributes and their state from the entities from which they originate (which have many attributes). So attributes do not have autonomous identification and state either in the data model or the code. So in prior art, attributes cannot be connected by logic to form a cause and effect model in order that node clusters at various layers of abstraction can be modelled. Entities or objects can be abstracted to more generalized versions but generalized entities or objects do not constitute models as in the Overlay where the nodes are connected by cause and effect. Therefore directly comparing entities and objects to each other at various levels of abstraction can only yield a yes or no matching result. There cannot be a similarity comparison because there is no activity/process/goal model involved in an entity or object alone. Comparison for similarity requires logic to relate attributes to logic in order to define how attributes serve processes and goals. Another way to say this is that similarity requires data schema and embedded code so that the functionality can be compared for what it actually does to arrive at any conclusion about similarity. See also discussions elsewhere in this specification regarding the importance of abstraction for similarity and the importance of similarity comparisons especially when various stakeholders require tangible compliance criteria regarding features and capabilities to satisfy expectations of systems they do not control but rely on in some way.

The various Overlay models in the levels of abstraction discussed above and in FIGS. 3a, 3b, and 3c, can represent any software application and are not limited to high consequence operations or tankers. Abstractions can also serve many purposes including but not limited to showing similarity between underlying systems 1 to N in each layer of abstraction below, showing points of integration between systems as illustrated in FIGS. 3b and 3c, providing means to monitor, regulate, standardize the activity of underlying systems 1 to N and many related purposes.

Furthermore, the Overlay model semantics can be abstracted and compared for what the model actually does and this can be across domains. This is possible by virtue of the Overly model which includes the node cluster, goal proximity between nodes, other logic between nodes, actor and stakeholder assignments to nodes, context/state assigned to nodes, units of quantity assigned to nodes and other criteria mentioned herein.

Figure 4:
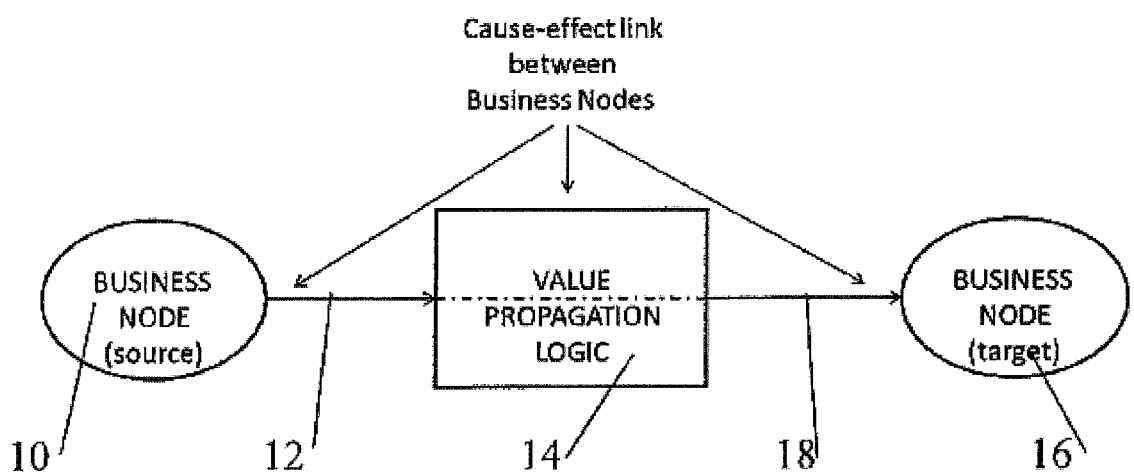
FIG. 4 graphically illustrates a cause and effect link between business nodes of an enterprise as modelled in the Overlay.

There are different ways to propagate values between nodes. As one exemplary method, FIG. 4 graphically illustrates a cause and effect link between business nodes of an enterprise as modelled in the Overlay. The Overlay operates on a continuous reasoning cycle. At run-time, when a new information datum is entered into the system either from a sensor, a user or another system, a source node 10 connected to this datum applies validation logic and state-change logic and then up-dates its state and risk (activation) status accordingly. Outgoing links 12 of the source node 10 are used to propagate information and the status of the source node (which could be, for example, at-risk or its value changed triggering propagation) to other nodes in the model which are connected via these outgoing links. Once an outgoing link 12 is activated its value propagation logic 14 is applied in order to send information to a target node 16. This same cycle is repeated, when the target node 16 obtains values from its incoming links 18. Even though propagation can commence given that a source node 10 is activated (becomes at risk) and its outgoing links 12 are triggered, only the nodes in the appropriate context are shown to the user that are at risk. This allows for the user during a consultation session to see only the nodes that belong to the right context.

The reasoning cycle for a given node is depicted in the following list of steps and applies for each node:

Step 1: Information (data node) or an internal/external event is provided as input to a business node through an incoming link.

Step 2: The node upon reception of data through its incoming link:

a) Triggers its logging facilities;

b) Triggers its validation logic and if its validation logic allows it proceeds to step 2.c.;

c) Triggers its state change logic, evaluates its risk levels and its state (e.g. from not-at-risk becomes at-risk or vice-versa) and Step 2.d commences. A node becomes at risk or alternatively ceases to be at risk or reaches an unchanging stable value, when its state-change logic, upon reception of input through an incoming link and in compliance with its validation logic, dictates so. For example, target node N1 may have three incoming cause-effect links with source nodes N2, N3, and N4. Assume that N1 is presently at risk or has a certain status value. One incoming link may provide values from a source node N2 indicating that node N2 just became not-at-risk or has a value that does not induce propagation, while the other two source nodes N3 and N4 are still at-risk or have values that induce propagation via the cause and effect logic stemming from each node N2, N3. The N1's validation logic and state-change logic may determine that N1 be kept under at-risk status or status awaiting change, if for example N1's validation and state-change logic require all nodes N2, N3, and N4 be not-at-risk or not requiring status change for N1 to be not-at-risk or not requiring status change. Nodes with closer proximity to high level enterprise goal are evaluated first in cases where processing resources are scarce, for example in an emergency;

d) If the context of the node is compliant with the user's role and/or node is in the context in which the current consultation session takes place then the node is shown to the user as being at risk. If no context information is available for a node, it gets the missing context information from along the reasoning path exercised so far. For example assume that 10 ships with different names as contexts may propagate to 10 other nodes with the corresponding ships context until they reach an all ships node that has no ships context and aggregates the statuses for each individual ship propagation. The process proceeds to Step 2.e;

e) User interface (UI) nodes are notified and, based on the alert level of the business node, the client-side UI device/display re-arranges the information sorted according to the alert level of the displayed node. UI nodes can be notified immediately or after a predefined group of business nodes have been notified (i.e. visited by the process); and f) The outgoing links are triggered and their value propagation logic executes and goal proximity scores are calculated or other values are calculated based on the units of the nodes statuses and the propagation logic. If there are no outgoing links the process terminates. If there are outgoing links, the process proceeds to Step 3.

Step 3: Once an outgoing link is activated and its value propagation logic is computed, the computed information and values are then fed into the link's target node and Step 2 is performed.

The models preferably converge. That is, cycles should be avoided. However, cycles may occur in incomplete models as a result of incomplete feedback loops, or incomplete model merging. The cycles may provide infinite oscillations in states and could cause the process to continue forever. In order to avoid infinite oscillations, the system records its model's global state (the state and context of each node) and if the current global state of the system/model is the same as a state that has been previously reached (oscillation), the reasoning process terminates. Feedback loops can be avoided when the model is sufficiently defined by way of node breakdown such that feedback to a causal node is diminished after each repetition.

Even though the propagation of values is solely achieved by domain/business nodes and their state parameters and the value propagation via logic between nodes, the semantics of Overlay model are such that goal proximity as a type of relevance criterion, can be a primary factor in the Overlay for computing the "strength" of propagating values via a link when required. For example, if a value is carried via links along a path, the "strength" or "importance" of this value is high when, as a function of the steps and logic of the path, the process reached a high level important node. So nodes that are closer to a goal may be of higher importance than other nodes. Even though these concepts may be enforced, the semantics of the model allow for such concepts of path length and goal proximity. This is a primary way to prioritize model propagation at times when processor processing resources are lower than required so that important processes are processed first.

In an example of Goal Proximity processing, Proximity (G, N) of a business node N with respect to a goal business node G, is a property of the business node N, and refers to how close in terms of a reasoning cause-effect path length is node N to node G, and/or the strength of the cause-effect relationship from node N to node G (i.e. how much the business node N contributes to the increase or decrease of the risk level of node G). For example, one of the paths from node N to node G has a length of 10 (i.e. it has 10 links from N to G) but so far 6 links along the path have been activated (e.g. from node N to node $N_6$). Note that goal proximity of node $N_6$ to a goal node G can be determined by the length of the remaining path (i.e. 4 in the example above), or as a function of the strengths (i.e. weights) of the weights along the remaining path from $N_6$ to G. An example of such a function could be the average of the weights along the path. For example, the strength of node $N_6$ could be $(w_{6,7}+w_{7,8}+w_{8,9}+w_{9,G})/4$, where $w_{6,7}$ is the weight of the link from node $N_6$ to node $N_7$. Another example of such a function can be Goal Proximity $(N, G)=\max$ over all $P_j$ $(\Sigma_{i=1 \ldots k} w_{i,m})/k^2$ where $P_j$ is a path leading from N to G, k is the length of this path $P_j$, and $w_{i,m}$ is the weight of the link from node $N_i$ to node $N_m$ in the path $P_j$. Other functions that take into account all the weights along the reasoning path (e.g. the weights of the links that have already been traversed and the weights of the remaining links towards the goal node G.

A reasoning path length of a business node N to a goal node G, is defined as the length of the path (in graph theory terms) that is faulted by cause-effect links from business node N to goal node G. A business node N may have different cause-effect paths to goal node N. As shown in FIG. 2, each such path has its own length, so one can define the lengthiest path and the shortest paths. In any case, each path length is determined by the links that have been activated so far from node N towards the goal node G. For example, one of the paths from node N to node G has a length of 10 (i.e. it has 10 links from N to G) but so far 6 links along the path have been activated (e.g. from node N to node $N_6$). In this respect the goal proximity along this path is 4, the length of the path traversed so far is 6, and this current reasoning path from N to G is 10. Note that goal proximity of a node (e.g. $N_6$) to a goal node G is determined by the length of the remaining path (i.e. 4 in the example above), or as a function of the strengths (i.e. weights) of the weights along the remaining path from $N_6$ to G. An example of such a function could be the average of the weights along the path. For example, the strength of node $N_6$ could be $(w_{6,7}+w_{7,8}+w_{8,9}+w_{9,G})/4$, where $w_{6,7}$ is the weight of the link from node $N_6$ to node $N_7$. Another example of such a function can be Goal Proximity $(N, G)=\max$ over all $P_j$ $(\Sigma_{i=1 \ldots k} w_{i,m})/k^2$ where $P_j$ is a path leading from N to G, k is the length of this path $P_j$, and $w_{i,m}$ is the weight of the link from node $N_i$ to node $N_m$ in the path $P_j$.

The reasoning process along all nodes can be seen in two different modes; the top down mode and; the bottom-up mode.

In the top-down mode, the user or a third system selects one or more goals to be fulfilled and a context in which the goals should hold. In the top-down mode of reasoning, the reasoning process attempts to verify all nodes that contribute towards the satisfaction of the selected goals.

In the bottom-up mode, the user or a third party system provides the context and all data that are available and all relevant (connected) Overlay nodes are activated. Consequently, the activated nodes (i.e. nodes that change state), may activate other nodes through the cause-effect links. The process continues on a loop activating all nodes that can be activated, and the process terminates (i.e. converges) when all nodes and all links that could have been activated in the model, have been activated, and/or a global state that has been seen before is reached. A global state is defined as the collection of all states of all reachable, in this session, nodes in the model.

The algorithms that follow are exemplary and provided for illustration. It is recognized that they may be re-assessed, evaluated and altered to fit implementation goals by system designers.

Top Down Reasoning

Figure 5:
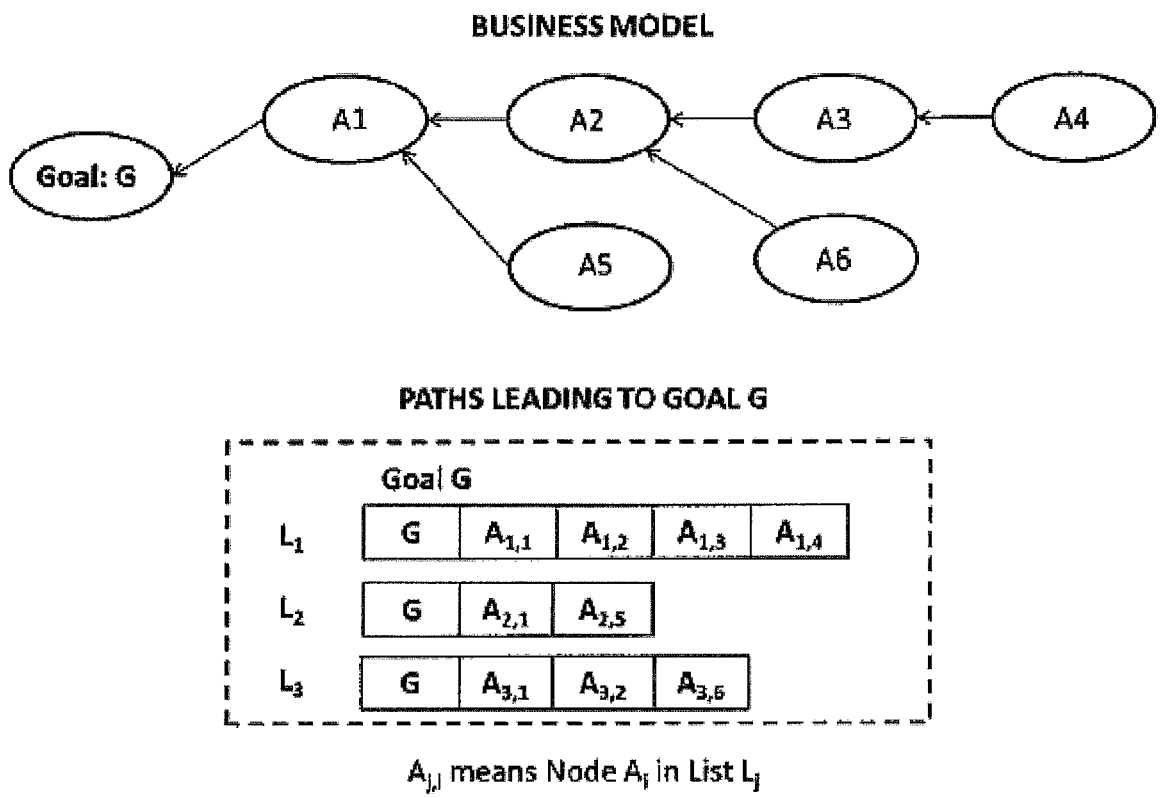
FIG. 5 graphically illustrates different cause and effect path lengths leading to the same goal.

FIG. 5 graphically illustrates different cause and effect path lengths leading to the same goal. The top-down global reasoning process for each goal G and context CTX is described by the following phases and steps:

Phase A. Initialize Goal and Context
1. Let G be the top goal identified by the user or by an automated process based on past cases or past risk rankings, opportunities and threats. Let the context of the session be denoted by CTX.

Phase B. Identify Paths Leading to Goal
2. Let $L=[L_1, L_2, \ldots L_i]$ be the list of lists (paths), where each path is composed of process model nodes leading through cause effect links to goal node G (such as the paths $L_1$, $L_2$, and $L_3$ depicted in FIG. 5.
3. Let each list $L_j$ in L, be composed of the process model nodes so that $L_j=[G, A_{j1}, A_{j2}, A_{j3}, \ldots A_{jn}]$ (note that the size of each list $L_j$ may differ depending the length of the path leading to goal node G.

Phase C. Create Working List
4. Create a working list $WL=[A_{11}, A_{12}, \ldots, A_{21}, \ldots A_{2n}, \ldots A_{i1}, A_{in}]$ (i.e. a list composed of all elements of the lists $L_j$ in L, that is all nodes in all paths). Note that there may be duplicate nodes in the working list WL because these nodes appear in different paths.

Phase D. Process Working List
5. While WL has elements and the user has not terminated the session DO else TERMINATE
   5.1 Sort list WL according to risk, level, priority, severity, past experience or, context in descending order. The node with the highest score appears as the first element in the list WL. Let us call this node $C_k$. Note that this node appears in a path towards G.

Phase E. Dynamic and Context Aware Interaction with User
5.2 Set as $U_k$ the node in the user interface model that corresponds to the process model node $C_k$, and $C_k$ is in context CTX
5.3 If $U_k$ is to obtain data from the user, then:
   5.3.1 Create a form to be sent to the client device so that the user can input data $D_{k1}$, $D_{k2}$, $D_{k3}$ etc. Logic for the creation of forms is embedded in each node $U_k$, and on the client device.
   5.3.2 In case node $C_k$ is a cluster of nodes in the process model, expand the nodes so that the user can appropriately provide the required data for each node in the cluster through the corresponding user interface model nodes $U_{kx}$. If the node $C_k$ is a sequential pattern then for each node in the sequential pattern visit the node and execute it. Execution of a node in a sequential pattern means that either the code in the node runs, or the user performs an action as instructed by the node and its rendering logic, or data are read or written from/to a data source/sink or a third party external system. The actions of a node in a sequential pattern can be either Synchronous, or Asynchronous. Synchronous means that all system execution halts until this action is performed. Asynchronous means that the action proceeds independently and informs the system that it has completed and provides any data to the system.

5.4 If $U_k$ is to obtain data from a sensor, then invoke software that reads data $D_{k1}$, $D_{k2}$, $D_{k3}$ etc. from the appropriate sensor.

Phase F. Assignment of Values to Business-Model Nodes 5.5 Feed data $D_{k1}$, $D_{k2}$, $D_{k3}$ etc. to a data node $IN_k$ and propagate the values to business model node $C_k$. In this respect, node $C_k$ has now obtained its new values.

Phase G. Computation of New State and Risk Level for Node 5.6 Evaluate new state S, risk level R, and outgoing results F for each outgoing link of node $C_k$.

Phase H. Goal has been Reached 5.7 If $C_k$ is the top goal node G then notify user with results (i.e. risk values of node G) and Terminate.

Phase I. Propagation of Values to Other Nodes 5.8 Propagate values, state, context, roles:

5.8.1 Identify all nodes $N_{k1}$, $N_{k2}$, ..., $N_{kx}$ that are directly linked to node $C_k$ via incoming cause-effect links and appear in a path towards G, that is nodes $N_{k1}$, $N_{k2}$, $N_{kx}$, that is they appear as elements in a list $L_1$, $L_2$, ..., $L_i$.

5.8.2 For each node $N_{k1}$, $N_{k2}$, ... $N_{kx}$ 5.8.2.1 Propagate values using the value propagation logic of each of the links from node $C_k$ to nodes $N_{k1}$, $N_{k2}$, ... $N_{kx}$.

5.8.2.2 Evaluate new values for $N_{k1}$, $N_{k2}$, ... $N_{kx}$ using the validation and state change logic embedded in each node $N_{k1}$, $N_{k2}$, ... $N_{kx}$ 5.8.3 Remove node $C_k$ from the list WL.

5.8.4 Go to Step 5.10.

Phase J. No Propagation Required 5.9 If for some reason node $C_k$ does not warrant propagation of its values and state to other connected to it nodes (i.e. propagation sequence is cut), remove node $C_k$ from list WL.

Phase K. Optimizations 5.10 System may remove for optimization purposes other nodes from list WL that become of no relevance or have low score.

Phase L. Iteration Step 5.11 Go to Step 5.

Note that G may be an artificial top goal that makes a set of goal nodes converge to, or be one goal node from a list of goal nodes $L_G$. The above process will commence for each goal node $G_i$ in list $L_G$. An issue to be considered in the final design of any reasoning algorithm is how to deal with cycles in the model, in order to avoid either infinite loop propagations, or oscillations (the model's global state—the collective state of all nodes—oscillates from one global state to another). The primary method is to break down subordinate nodes in the subordinate part of the cycle to ensure that loops are fed back to partial subordinate or intermediate nodes and their logical links and thus are diminishing.

Bottom Up Reasoning

Similarly, the bottom-up global reasoning process for input data D={$d_1$, $d_2$, ... $d_n$} and context CTX is described by the following phases and steps:

Phase A. Initialize Worklist

1. Let the worklist WL be WL=[$N_1$, $N_2$, ..., $N_k$], where $N_1$, $N_2$, ..., $N_k$ are the business nodes that are immediately affected by data in D.

Phase B. Select Node and Get Data

2. While WL has elements and the user has not terminated the session DO else TERMINATE 2.1 Sort list WL according to; level of effect or risk level. Other measurable criteria such as priority, severity, past experience may be factored in via additional logic. Context plays a role in matching the context of nodes N to data in D to get logical matching of context when propagating. Context can be a priority criterion in certain situations. The node with the highest score appears as the first element in the list WL. Let us call this node $C_k$.

2.2 Set as $U_k$ the node in the user interface model that corresponds to the process model node $C_k$, and $C_k$ is in context CTX 2.3 If $U_k$ is to obtain data from the user, then 2.3.1 Create a form to be sent to the client device so that the user can input data $D_{k1}$, $D_{k2}$, $D_{k3}$ etc. Logic for the creation of forms is embedded in each node $U_k$, and on the client device.

2.3.2 In case node $C_k$ is a cluster of nodes in the process model, expand the nodes so that the user can appropriately provide the required data for each node in the cluster through the corresponding user interface model nodes $U_{kx}$. If the node Ck is a sequential pattern then for each node in the sequential pattern visit the node and execute it. Execution of a node in a sequential pattern means that either the code in the node runs, or the user performs an action as instructed by the node and its rendering logic, or data are read or written from/to a data source/sink or a third party external system. The actions of a node in a sequential pattern can be either Synchronous, or Asynchronous. Synchronous means that all system execution halts until this action is performed. Asynchronous means that the action proceeds independently and informs the system that it has completed and provides any data to the system.

2.4 If $U_k$ is to obtain data from a sensor, then invoke software that reads data $D_{k1}$, $D_{k2}$, $D_{k3}$ etc. from the appropriate sensor.

Phase C. Assignment of Values to Business Nodes 2.5 Feed data $D_{k1}$, $D_{k2}$, $D_{k3}$ etc. to a data node $IN_k$ and propagate the values to connected business node $C_k$. In this respect, node $C_k$ has now obtained its new values.

Phase D. Computation of New State and Risk Level for Node 2.6 Evaluate new state S, risk or impact level R, and outgoing results F in each outgoing link of node $C_k$ by applying the value propagation logic of each outgoing link.

Phase E. Propagation of Values to Other Nodes 2.7 Propagate values, state, contexts, roles:

2.7.1 Identify all nodes $N_{k1}$, $N_{k2}$, ... $N_{kx}$ that are directly linked to node $C_k$ via incoming cause-effect links.

2.7.2 For each node $N_{k1}, N_{k2}, \ldots N_{kx}$
    2.7.2.1 Propagate values using the value propagation logic of each of the links from node $C_k$ to nodes $N_{k1}, N_{k2}, \ldots N_{kx}$.
    2.7.2.2 Evaluate new values for $N_{k1}, N_{K2}, N_{Kx}$ using the validation and state change logic embedded in each node $N_{k1}, N_{K2}, N_{Kx}$
2.7.3 Remove node $C_k$ from the list WL.
2.7.4 Add nodes $N_{k1}, N_{k2}, \ldots N_{kx}$ in WL by excluding any of these nodes that have been previously in WL (this is for avoiding infinite iterations/oscillations).
2.7.5 Go to Step 2.9.

Phase F. No Propagation Required
  2.8 If for any reason node $C_k$ does not warrant propagation of values to other nodes (i.e. propagation sequence is cut), remove node $C_k$ from list WL.

Phase G. Optimizations
  2.9 System may remove for optimization purposes other nodes from list WL that become of no relevance or have low score.

Phase H. Iteration Step
  2.10 Go to Step 2.

Figure 6:
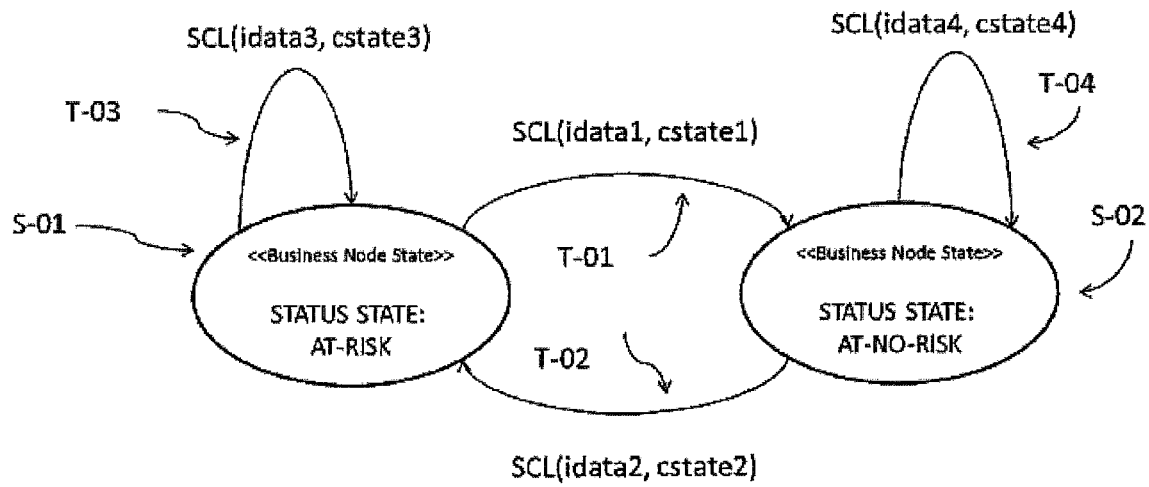
FIG. 6 graphically depicts a state diagram illustrating business nodes in one of two possible status states a) at-risk status or b) at-no-risk status.

Business nodes can be in one of two possible status states a) at-risk status or b) at-no-risk status. However risk or no risk is an aspect of status change and should not be considered only the sense of a hazard. At risk or no risk can respectively mean about to make a change to the next in propagation affected nodes or not about to make a change to affected nodes. Or, at-risk status could mean that a process needs stakeholder attention while at-no-risk could mean the process has low need for user attention. The state diagram that describes this is depicted in FIG. 6. FIG. 6 depicts that a node can be at either AT-RISK status-state (S-01) or AT-NO-RISK status-state (S-02). If a node is at state AT-RISK and upon receiving input data (idata1) and being at current state (cstate1), its state change logic function (SCL) can transfer the node through transition T-01 from status-state AT-RISK to a new status-state AT-NO-RISK. The similar argument holds for the other transitions. It is noted that a node being at status-state AT-NO-RISK, may receive input data (e.g. idata4) at a current state (e.g. cstate4) and stay at the same status-state (see transition T-04).

Once a node changes its risk state, then it propagates its attribute values to its neighboring nodes $N_i$ through its outgoing cause-effect links. This may cause, through the value propagation logic of its outgoing links and the validation logic of the target neighbor nodes, the neighbor node $N_i$ to consequently change its own status-state. This status-change may propagate then through the model graph.

It is to be noted that the above examples refer to at risk nodes. These may in most cases also refer to affected nodes without an element of risk as for example a propagation that affects the next node as in a transaction in which the affected node is for example in a vending machine to release a confectionary item after payment is received, or in a tender process to approve a vendor to the next stage of processing after several price comparison algorithms are satisfied.

The Overlay also differs from prior art in that the run time engine is programmed to run conversions without running data location and retrieval queries associated with relational data models as in prior art. If data retrieval queries are used, the domain model traceability may be lost, therefore data location and retrieval queries are avoided in the Overlay domain model. So unlike prior art, the Overlay run time will not run relational data model queries combined with conversion algorithms. However for any multi-stage calculations in domain, each Overlay domain model conversion algorithm, must be able to refer to those nodes and their status and their state parameters that are linked to the conversion algorithm. But this reference to nodes, must only refer to the immediately subordinate nodes otherwise the traceability can be lost.

In an embodiment of the Overlay propagating model, context is assigned to each node to depict what in the prior art is a defining aspect of the state, such as a key attribute of a business object which links several business objects and has its own attribute in yet another business object. The attributes that in the prior art are associated with the context as entity attributes of a key identifier, may, in the Overlay, also become nodes and are connected by computer readable logical links to where they are active in propagation within the overlay propagating model of interconnected nodes. For example, if a crew member is a context for a crew activity such as to receive a paycheck, "receive paycheck node" is assigned the context of the particular crew member. However, if the crew member's shoe size is needed for emergency apparel, and there is a node denoting "matching of the crew members shoe size to the available emergency apparel" then node denoting "shoe size" becomes an active part of the model propagating accordingly to reassure the enterprise system that there is a match. This "shoes size" becomes connected to "matching of the crew member's shoe size to the available emergency apparel" via a cause and effect link while both nodes are assigned the context of the particular crew member. In prior art, crew member context would have attributes and shoe size could be one of them. However, prior art systems do not accommodate the code adjacent to the attributes such as "Shoe Size" linking this to the node "matching of the crew member's shoe size to the available emergency apparel". Therefore the attribute could be lost in the conventional data schema if it was not incorporated as an attribute in the crewmember's business objects where the crew member is a key attribute or context. The grouping of attributes within business object such as crew members makes compatibility between systems that are designed separately more difficult for the following related reasons. The attributes are not semantically clear unless they are adjacent to logical links depicting how they are used in a node cluster and therefore cannot be easily abstracted and compared for similarity. Also the attributes are in a group such as a business object that has no computer readable logical relationship between the attributes in the business object and this cannot be assigned computer readable similarity. So business object or entities in prior art are either identical or different in a way that is undefined to the computer. In the Overlay the logical links and autonomous attributes like shoe size are connected by computer readable logic to the nodes they affect and therefore the semantics and location of these attributes like shoe size in the data model are unambiguous. IoT systems needing to interoperate will benefit greatly from being described in Overlay terms including nodes state and adjacent links.

In an embodiment, the Overlay context is assigned to a node as a human readable differentiation of other contexts for a node in the same name. Context is therefore a human readable property of the node. For the machine, context defines additional nodes with the same names identified separately. For the user interfaces in the Overlay, context is a way to present many nodes in different contexts without repeating the name of the node. In storage each node with a different context regardless of whether the nodes label is the same is stored independently so that each status value stored is not confused with status values of nodes with the same name and different context.

Context identification in a domain enterprise sense in the Overlay is achieved by identification clusters within the domain model that can be associated with contexts; that is contexts as labels to differentiate same name nodes with different contexts. These identification clusters may contain logic and weighting to serve to emulate how identification is actually achieved in the domain. For example identifying people as crew of a ship can be a simple use of their first and last name when the software application needing this identification only schedules use of recreating facilities on board. However if a crew list is used to identify crewmembers to present to shore immigration authorities, we need; full name, middle name, last name, we need passport numbers, seaman's book number, date of birth, rank on board, license numbers etc. In a further example to identify crew members to assign to a critical processes as actors may require more identification including related attributes such as skills experience and more license details. Therefore the combinations of identification depend on how they will be used and this involves logic and is therefore placed in the domain grid.

The Overlay allows each node status to be associated with the node state including specific context or assignment to a role. This combined with the adjacent logic means that model attributes obtain specific semantics assisted by cause and effect. This is so because the node and its accompanied logic are far better somatically defined without the need for massive effort to standardize semantics.

In another embodiment, the Overlay allows the abstraction of specific functionality into abstracted functionality. For example a repair job for a ship has dates that the ship and its components are available to be repaired. The resources that are available will also need to be scheduled. There are also jobs that are prerequisites of other jobs, jobs that are in conflict when they happen concurrently, resources that are occupied on other jobs etc. An overlay system can represent the process of scheduling resources and scheduling jobs. However an abstracted Overlay cluster can also be built that is abstracted compared to the domain cluster. This comes about by abstracting the scheduling process and abstracting the interactions and durations of abstracted resources and abstracted demand for resources. The use of an abstraction makes it possible to determine how a domain level scheduling process compares or complies with more general requirements for scheduling prioritization.

For example, scheduling of computer processor resources in resource sensitive systems the abstracted scheduling priorities can be set by the goal proximity of the processes being prioritized compared to other processes affecting the high level goals of the system, and the domain processing and job resources can be mapped to the abstraction to expose the prioritization to a supervisory level that can be regulated.

For example when scheduling computer processing resources in a critical IoT system used for example in avionics system, a vendor specific computer processing resources management system on one avionics system can be matched to an abstraction which is used to regulate such system to determine compliance with regulations. This can provide easily scalable supervisory systems to ensure compliance to resource prioritization across an interoperating system. In general, an abstracted layer of an Overlay domain model can serve to convey compliance of underlying software to goals and constraints of more than one stakeholder. This capability is relevant to interoperating systems which have no overarching single stakeholder to assure interoperability.

The use of goal proximity in the domain or in abstraction can align prioritization requirements of any sort with the embedded cause and effect of the Overlay models in this way exposing the prioritization of disparate systems and comparing to stakeholder requirements.

The Overlay allows transparent propagation of changes in the enterprise or multi-enterprise model for upgrading purposes. The Overlay also enables splitting the data model into smaller models on each board and chip. The Overlay enterprise model joins and relates disparate independent components by use of its intrinsic transparent propagation paths. Without this feature the interoperability of IoT components and collaborating computerized small devices is seriously impeded. In addition for explicit depiction of propagating values from one component of an interoperating system to another, there is also the ability to use abstracted Overlay models to provide abstractions of the underlying functionality so as to expose interrelationships, constraints, capabilities, redundancies and other capabilities so that components from disparate systems can expose their capabilities to more than one stakeholder.

As compared to conventional software, by having far greater ability to trace changes in the system and their effect in propagation, the Overlay makes the testing and verification faster and more transparent, makes upgrades smaller in volume and the development process of upgrades much shorter. This can be achieved by the identification of dependent components and the consequent compilation and prioritization of the test cases to be considered during the testing and verification process. Therefore, in domains like major emergency response applications like a hostage or terrorist attack in a city, where upgrades can prove to be required during the emergency, since no emergency is ever the same as another, it is possible to upgrade using the Overlay by distributing very light upgrades of only the node clusters that have changed.

Alternatively, it allows upgrades to be enacted by physically distributing new ultra-lightweight models above the special purpose microkernels units (board or chip).

With conventional methods, an upgrade during an emergency would require a massive programming undertaking to cover the upgrade work and testing in time, and also a huge volume of upgraded material to be passed via conventional means, for example by cell or internet, to small computerized devices in the field.

An advantage in an emergency response of using ultra-lightweight models (for board or chip) combined with domain Overlay models instead of conventional software processing and associated hardware is that the performance, security and safety are better by orders of magnitude. Security refers to the ability of a malevolent user to manipulate the system at will, or acquire confidential information. In the case of an emergency response, safety refers to an ability of the system to dynamically and effectively adjust to unforeseen conditions.

In an emergency response, this means that small devices can manage larger enterprise models without requiring a central server unit to be a large installation that is perhaps not suited to the unpredictable location of the emergency. Also, the absence of a conventional server unit reduces the vulnerability to security breaches by avoiding use of software languages and storage configurations that hackers are familiar with and more capable of attacking.

One necessary feature enabling upgrading deliverables to be small in volume is the nature of the data model of the Domain Overlay model which combines the data and executing logic. The result of this is that a huge enterprise model can have a data model broken up into units assigned to each board and chip. It is possible to have replication of parts of the Overlay model in different boards and chips or to have additional modelling by way of overlay model for specific aspects of recovery functionality in each board and chip. These design provisions and similar methods serve to avoid situations in which parts of the model are not available at all times due to lack of connectivity or failure of a process to propagate data between units or failure of a hardware processing unit. This is not possible with conventional software where the data model is one and cannot be split after the initial design. This is possible in the Overlay because any unit that loses its ability to function can be detected by the other units which can be preconfigured to function in its absence. If it is a central co-ordination unit that loses its ability to function, it can be replaced by an identical node cluster on a replacement unit. The remaining functional units can have sufficient logic via nodes and links to allow for the interim global state and compensate, as well, as adapt themselves to a new unit. This is because each unit has specific traceable propagation to other units and therefore the nature of the propagation is clear; as well as, the consequences of its interruption. It is a matter of adding nodes and logic to each unit at any time in the lifecycle of the system to provide compensation for functional interruptions of other units. This is possible in conventional systems only if partitioning is done at initial design stage because the data schema in conventional systems does not define propagation and the code is unstructured and also does not depict propagation in a traceable way. Without this traceability it is very difficult to build system recovery methods except at original system design.

Figure 7:
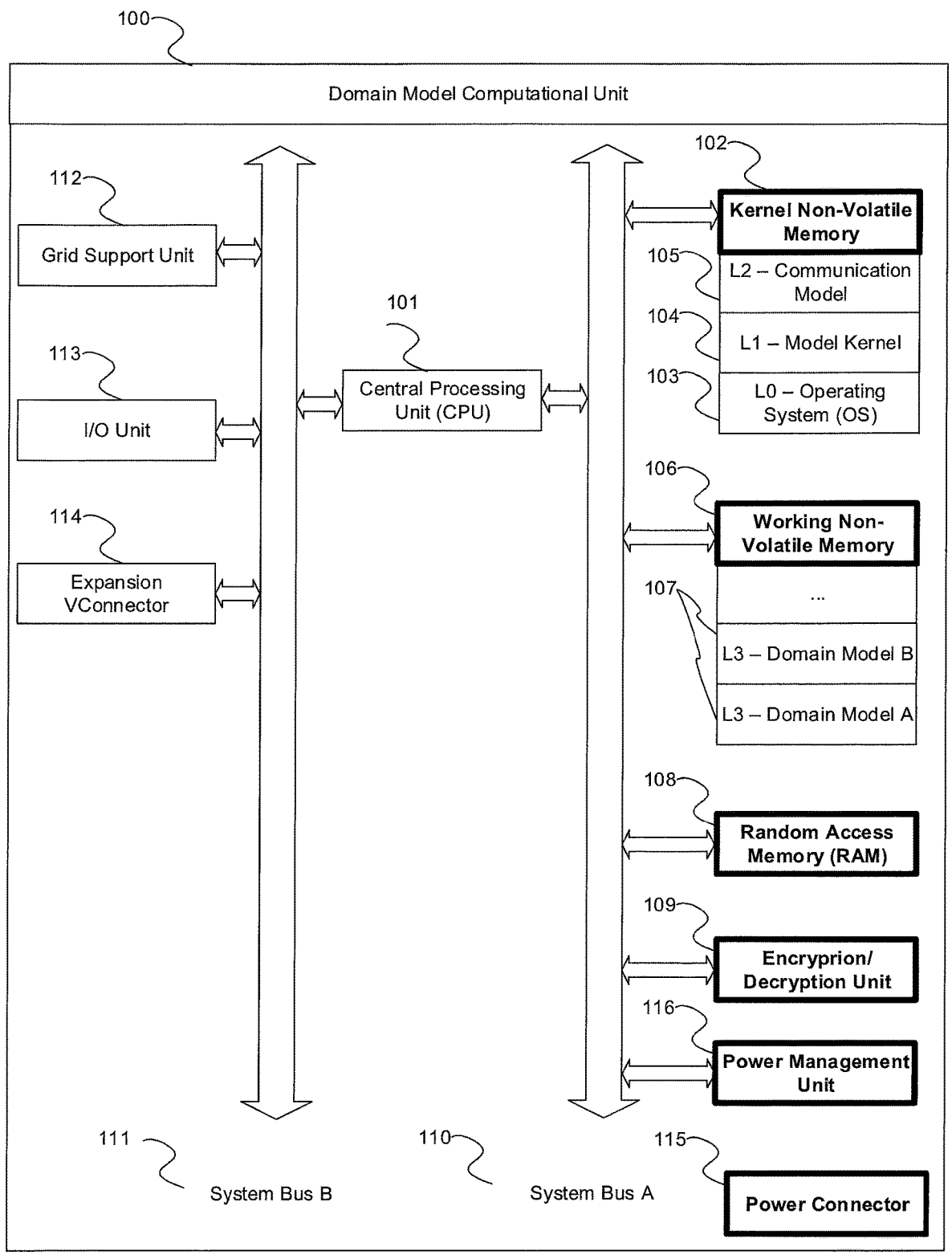
FIG. 7 is an example block diagram of a domain overlay model computation unit.
Figure 8:
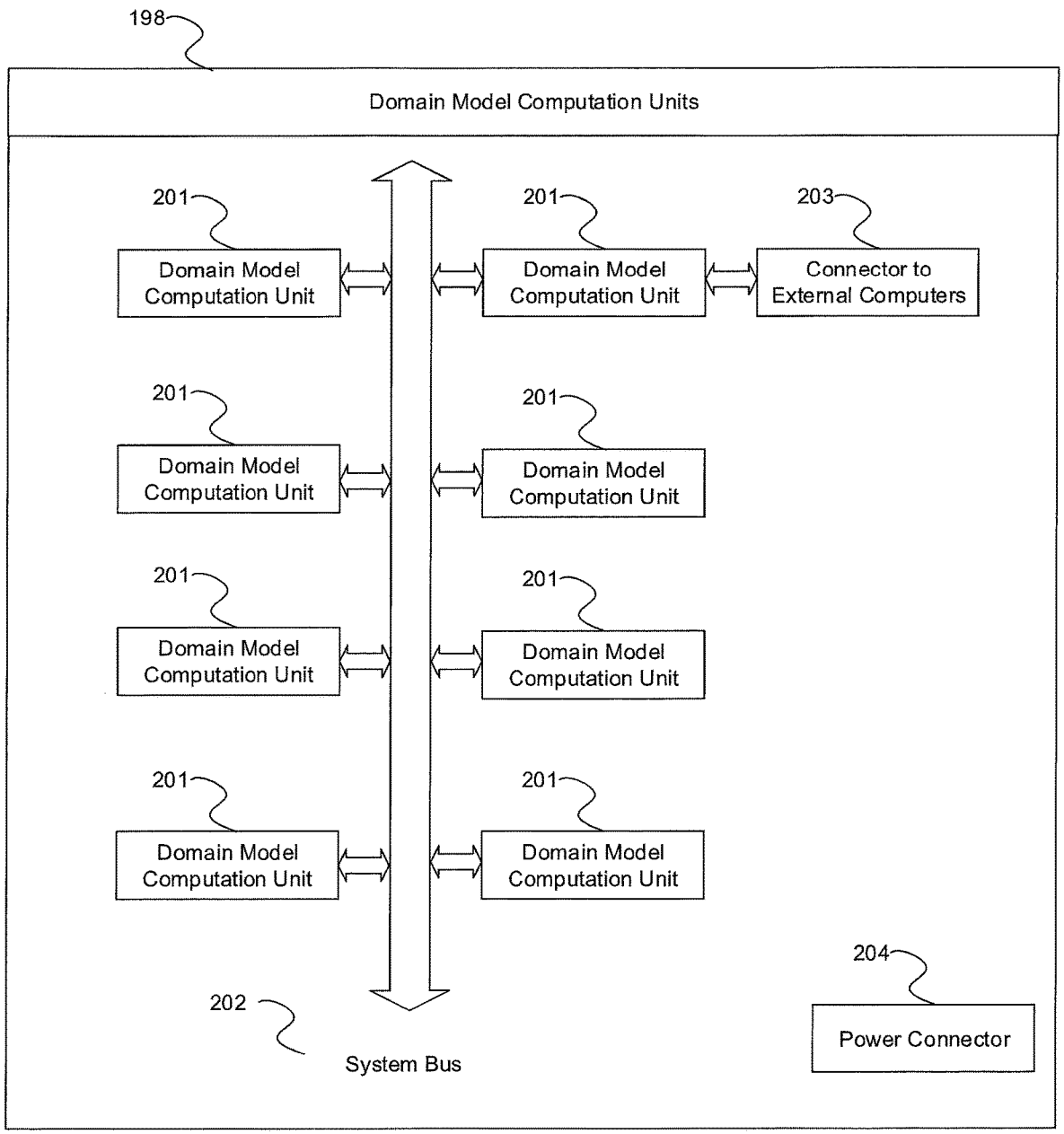
FIG. 8 is a block diagram of a grid of domain model computation unit.

FIG. 7 is an example block diagram of a domain overlay model computation unit. Features of this computation unit are:

100: Domain Model Computation Unit. It is a single board computer that communicates with the outside word in Model Language. It will be appreciated that the device 100 is only one example of a portable device 100. It is a multifunction device that may have more or fewer components than shown in FIG. 7. Device 100 could be combined in a grid of two or more (as shown in FIG. 8), defining a homogenous cluster. In one aspect the Domain Model Computation Unit is manufactured in a single chip.

101: Central Processing Unit (CPU). It is a multipurpose, programmable device that accepts data as input, processes it according to instruction that are stored at memory modules 102, 106 and 108, encrypts/decrypts those using module 109 and provides the results as output stored at module 108, sends them to other units 198 (FIG. 8) or reads data from module 113 and outputs data to the same devices.

102: Kernel Non-volatile memory. It is hidden to any external access and communicates only with CPU 101. Its purpose is to store modules 103, 104 and 105 that constitute Kernel Memory. 103: L0-Operating System (OS). Contains the OS responsible for system initialization, file system, security, and command-line environment. Different for different CPU 101 components.

104: L1—Model Kernel. Contains instructions that provide the ability to the unit 100 to understand the Model. It could be updated only by the system manager. New kernels are provided in encrypted binaries and only the use of module 109 will decrypt and update the model kernel 104. The rationale is to provide a highly secure kernel that is almost impossible to be remotely hacked. Microkernels are updated by authorized users using Overlay Design/Development Platform. The update/upgrade package is encrypted at an organization base and decrypted at a local unit. At a minimum, the microkernel contains implementation of nodes, links and propagation model at CPU instructions. The model will call those implementations in order to execute any domain model.

105: L2—Communication Model. For client unit, this module contains the instructions in Domain Model language, to sync with server side part of the model.

106: Working Non-volatile memory. This memory modules contains the Domain Model(s). Unit supports more than one Model and could run those in parallel.

107: L3—Domain Model(s). Domain Model or Models that could be executed in parallel. Those modules are provided to Unit 100 through internet download or flash memory into an encrypted file. Unit 100 will decrypt and update those. The Overlay Design/Development Platform provides an ability for Domain Experts to define the nodes that will change (update/upgrade) and when.

108: Random Access Memory (RAM). Main memory of the unit, volatile. It supports commercial modules (provides the appropriate small outline dual in-line memory module (SODIMM) connector), up to 8 GB in one exemplary embodiment. In alternative exemplary embodiments larger or smaller capacities may be used.

109: Encryption/Decryption Unit. Unit responsible to encrypt and decrypt data exchanged with the outer world, or the files provided to upgrade modules 103, 104, 105 and 107. When the system receives a package/message, it uses the decryption part of the unit to decrypt it. When the system sends a new package/message, it will use the encryption part of the unit in order to encrypt it. After encryption, the unit sends the message.

110: Internal System Bus A. High speed system bus used by CPU 101 to send and receive data to modules 103-108. Only CPU and modules 103-108 have access to this bus.

111: Internal System Bus B. High speed bus used by CPU 101 to communicate with external world modules 112, 113, 114, and 115.

112: Grid Support Unit Connector. Connector that will be used to add more units, if required.

113: I/O Unit. Connector that provides analog and digital ports.

114. Expansion Connector. Connector used to add commercial expansion units or enterprise developed units.

115. Power Supply Connector. USB connector used to charge unit batteries or provide appropriate power.

116. Power Management Unit: Unit responsible for interfacing the power supply 115, the battery and the CPU 101 of the system. The CPU is informed about the charging status and the battery levels via this unit. In addition, it can implement specific power management policies according to the available energy of the system. Through these policies, it can act as a safety mechanism in cases of unacceptably low battery capacity, ensuring that the system will shut down in a consistent and safe manner.

FIG. 8 is a block diagram of a grid of domain model computation unit. Features of this domain model computation unit include:

200. Grid of Domain Model Computation Units. Server side grid of units that function either as a standalone computer or are connected to other computers. It is a single board grid computer that communicates with the outside word in Model Language. The Communication model is an Overlay Model. There is an Overlay Communication Node Cluster that defines and executes communications into the described grid. It is a multifunction device that may have more or fewer components than shown in figure. Device 200 could be combined in a grid of 2, 4 or 8 units, defining a homogenous cluster. Here, the CPU modules contain a more powerful component, still a low power consumption one (especially designed for mobile devices). In one aspect the Grid of Domain Model Computation Units are manufactured as a single chip system.

201. Domain Model Computational Units. Similar to the unit 100 of FIG. 7. A difference is that module 105 is now more advanced to support distributed model clusters.

202. Internal Bus. It serves the connection of all modules 201.

203. Connector to external computers. Connector enables unit 200 to communicate with external computers at high speed. Also, the unit provides the ability to communicate with similar units wirelessly.

204. Power Supply Connector. USB connector used to charge unit batteries or provide appropriate power.

In one embodiment, the product design includes a computer unit board composed of components described herein that are widely available and can be developed as a first version of such a computer. Prototypes are developed using discrete components. After stabilizing the microkernel, those components are all assembled into a single chip (with the cooperation of chip manufacturers) and sold as the chip and a printed circuit board having only the chip and some connectors.

In a second embodiment an expansion board having this layout can be designed and installed into a computer board, or placed in a stand-alone machine that will be connected to server computers using a high speed interconnection line (including but not limited to optical one). This will not necessarily have a web server or logging and monitoring services, or databases, etc. Those will exist as they do now on main computers. In practice, this new computer will have only server software installed and provide its contents as a service to the main computer.

The ability to add expansion units that contain the herein described single board computers or network of interconnected single board computers and specific purpose microprocessors, helps avoid upgrading complexities, by upgrading only a microkernel part and specific parts of the domain Overlay model. It also enables the development of new generation stand-alone mobile devices that are very easy to upgrade using cellular or internet, and allow the ability to link the device to a working environment and share information and resources.

The main unit is the "Domain Overlay Model Computation Unit". This is a low power consumption computer unit that is programmed as a Domain Overlay Model and does not use a generic programming language like C, C++, C#, Python, etc. It uses the Overlay model to provide an executing program by organizing status of node state parameters, organizing location of conversion logic and also the organization/location of the storage of data. Lower level languages may be used for conversion logic and commands to the processor.

It may be used to build enterprise models designed centrally or enterprise models consisting of prebuilt components from disparate designers. It may also be used to build client devices like, but not limited to, robots, drones, medical devices, IoT, etc. Smartphones can also be included and can be connected to a server domain model either continuously or intermittently. A characteristic of this unit is its security, performance and data and system state synchronization to a server domain model, when it has access to a server. It has a connector that provides an ability to connect expansion boards with, for example but not limited to, Wi-Fi, biomedical sensors, cameras, keyboards, touch screens, touch displays etc. An enterprise could connect commercially available expansion boards or develop its own.

To reiterate, both exemplary designs are programmed using Domain Overlay Models, have low power consumption components, provide high security and middle to high performance (depending on component 101) and allow both independence and interoperability of processing units.

The Overlay provides a new approach to software development industry. Its main goals are to reduce the complexity of software reasoning, storage, retrieval, propagation and traceability by adopting a model structure closer to that by which processes are carried out with less emphasis on entities to represent processes. Also, to enable abstraction and comparison of functionality.

The Overlay ecosystem contains tools and a platform model that shorten the time from design to production deployment but more importantly enables traceability resulting in much easier maintenance and evolution and much more efficient processing.

EXAMPLE

As one exemplary application, a single computational unit (hardware) that is based on understanding and running a Domain Overlay Model and providing the appropriate infrastructure. The hardware unit introduces a computing grid that is a grid of single units designed for distributed Domain Overlay Models, providing the appropriate security and performance. The Overlay Model Computational Unit is a secure, high performance, standalone unit.

The grid of Overlay Computation Units is preferred for componentized processing of the satellite model as it provides distributed processing that can recover from breakdowns much more easily. The distributed model is also friendly to decentralized design and upgrading to accomplish software design and implementation that cannot wait for a central stakeholder, like an enterprise or several enterprises, to control and synchronize development and implementation by use of Overlay traceability, data storage flexibility and other Overlay design characteristics.

The basic hardware unit is the "Domain Overlay Model Computation Unit". This is a low power consumption computing unit that is programmed as a Domain Overlay Model and does not conventionally use a generic programming language like C, C++, C#, Python etc. It may use some of these or other languages but does not the use the languages conventionally. It uses the Overlay model to provide an executing program and also the organization and storage of node status and states. Lower level languages may be used for conversion logic and commands to the processor.

Individual hardware units will be used to compose a collection of hardware units installed on the satellite. The hardware units can be generic in design. A characteristic of this hardware unit is its security, performance and ability to be synchronized in data and overall system state with a server domain model, when it has access to it. It has a connector that provides the ability to connect expansion boards for example (but not limited to) sensors, cameras etc.

The design, programmed using Domain Overlay Models, has low power consumption components, provides high security and middle to high performance and allows both independence and interoperability of processing units. Having the above grids with more than one computation unit adds redundancy.

The Domain Overlay Model Computation Unit typically has four modules, placed as a stack (in sequence):
   Satellite Domain Overlay Model;
   Platform Overlay Model;
   Overlay Core; and
   Operating System The first two layers could be subject to frequent upgrading from teams that have responsibility to create and maintain the satellite model. The last two layers are updated by a system manager only and change infrequently.

The Overlay has the ability to send messages from one unit to another one unit using the smallest packet of:
   Domain model updated node cluster;
   Source code of the updated node cluster; or
   Compiled code of the updated node cluster.

Every packet is compressed and encrypted. The receiver of the packet is the satellite unit, it decrypts and decompresses the packet. Every computational unit can have a specific module for compression/decompression and encryption/decryption. If the recipient is a local station or a terminal mobile device, the unit just passes those using a broadcast or point-to-point communication channels.

The models can be fragmented to smaller models that can communicate discontinuously. Every component of a domain model has its own self-contained information and passes the appropriate changes (not all) to the precise component of the model that will continue the process. So, only small packages are passed. In case the packages need to be very large or there is a hurry for them to be transferred to a unit that is not accessible locally, the system may use internet, disk or any supported media to transfer them.

Figure 9:
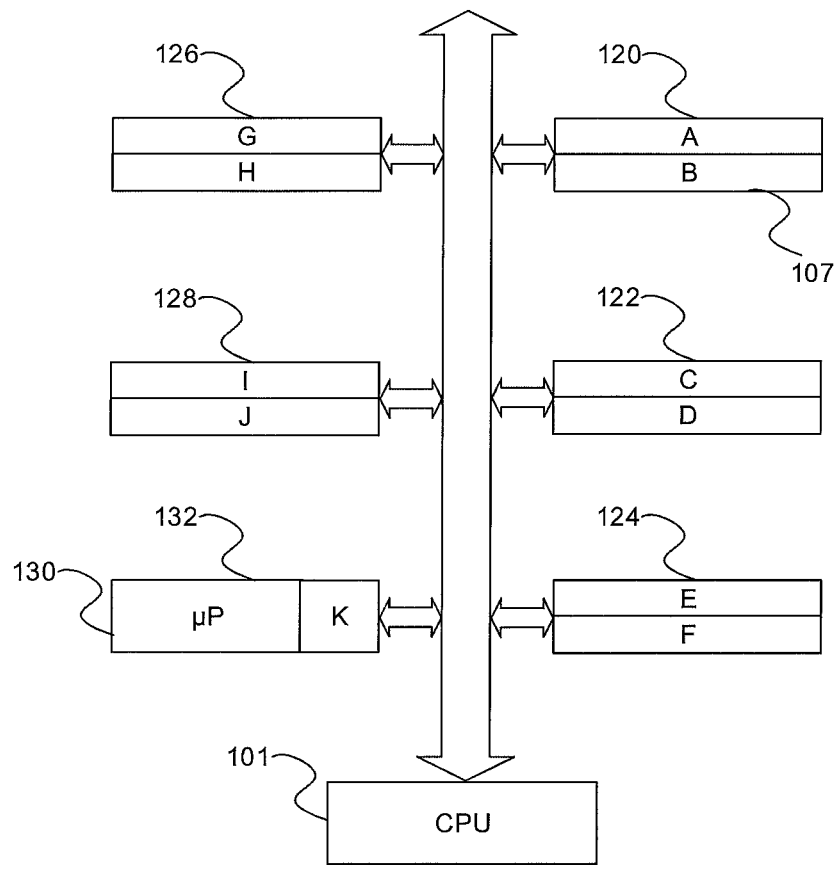
FIG. 9 is a block diagram illustrating the system including a central processing unit and a plurality of dependent partial units each assigned a role or stakeholder

In an embodiment illustrated in FIG. 9, the system includes a central processing unit 101 and a plurality of dependent (satellite) partial units 120, 122, 124, 126, 128, 130 assigned to roles or stakeholders of the process model on each satellite dependent unit. The partial units may communicate with each other and with the central processing unit through a wireless network.

Each satellite dependent unit includes a domain model computation unit (100 in FIG. 7) and one or more domain models 107. For illustrative purposes, the different domain models have been designated with a letter between A and K. This model of the enterprise is partitioned between the central processing unit 101 and the dependent satellite units 120-130 in a way that enables the satellite units to work independently when disconnected but without the co-ordination enabled by the central processing unit 101. If communication is lost between central processing unit 101 and dependent satellite units 120-130, the dependent satellite units 120-130 can still be useful to the corresponding role or stakeholder, as they will contain enough of the enterprise model to offer useful information. The ability to split the enterprise model enables the dependent/satellite units to be useful when communication is lost. Otherwise, the dependent/satellite units will have very limited functionality.

The splitting of the model to a central processing unit 101 and a plurality of dependent satellite units 120-130, with each unit installed on a handheld device can be made at the beginning of an emergency event. So the apportionment of the model to different devices can be tailored to the skills of the stakeholders at hand in an emergency and apportionment made in accordance with a role or stakeholder assignment of nodes and node clusters. The dependent units which are able to operate standalone for restricted functionality are tailored to the skills and therefore role or stake holding of the available personnel.

One aspect is that the model can break down into different smaller units as the personnel available in the emergency dictates so that the restricted functionality when offline is tailored to the role or stakeholder.

Figure 10:
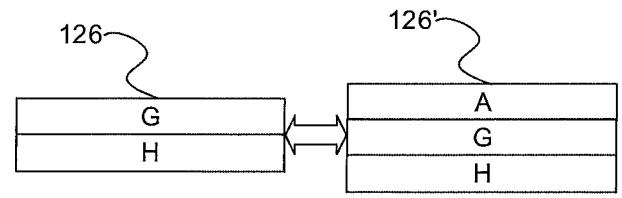
FIG. 10 is a block diagram illustrating how a domain model may be transferred from one partial unit to another partial unit.

Referring to FIG. 10, if a unit is damaged, domain models on that unit can be redistributed to remaining undamaged units. For example, if unit 120 (from FIG. 9) is damaged, domain model A may be redistributed to unit 126 and Domain Model B to either the same unit or a different unit. The same enterprise model can be distributed over several board chips such that when one board chip is damaged the enterprise model can be redistributed via an upgrade to the remaining board chips.

Referring back to FIG. 9, in another embodiment, the system can have a standby enterprise model 132 centrally on one handheld unit 130 while the remaining units 120-128 access the central processing unit 101 via the web and have minimal to no processing when offline. If the central processing unit 101 becomes unusable, then the standby enterprise model 132 can be activated on handheld device 130 or, if there is no pre-existing standby enterprise central model, a processing model can be installed on another unit via an upgrade. This allows the central processing model to be movable between hardware units so as to overcome the problem of central processing unit breakdown.

Every board component of a multiple board domain model can have its own self-contained information and passes the appropriate changes (not all) to the precise component of the model that will continue the process.

Figure 11:
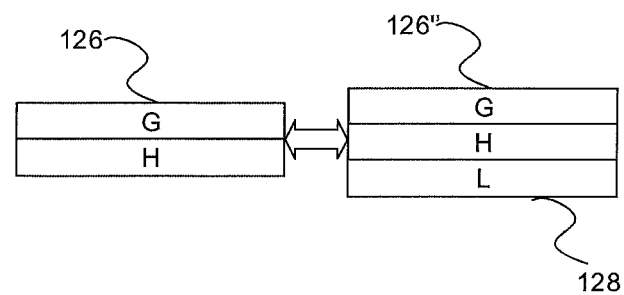
FIG. 11 is a block diagram illustrating the system accommodation for an unexpected occurrence insertion or removal of new nodes during runtime.

With reference to FIG. 11, emergency response involves unanticipated risks, unanticipated causes, unanticipated remedial actions, unanticipated detail support for users etc. To accommodate this, the model of the enterprise allows the central processing unit (101 in FIG. 9) to insert or remove new enterprise model nodes 128 into a unit 126 in time for utilizing the change during the current event. It also allows for enterprise model nodes to change their input from an existing datum point to other datum points also in time to utilize the change during the current event. Abstraction allows the enterprise model to find alternative data when the data the system has been configured to monitor falls short of needs. For example, a need could be to process personnel identification in a different format to that anticipated. In another example the need to process special electronic models of a building may be possible and relevant if they become available in an emergency. They would be accessed by the same, for example, escape route nodes but would reference different topographical data. In, for example, an airport emergency there could be a requirement of a procurement process that has not been anticipated such as introducing an external subcontractor to use special machinery to clear obstructing debris, who has not been cleared for security. This could be similar to emergency procurement of any other external source of personnel during an emergency. The system would not be able to provide the right procedures and response time estimates if it could not draw similarities between all processes needing external personnel and equipment while taking into considerations contextual differences such as which part of the airport new personnel and equipment will need to access. This could apply to anything from first aid to prioritization in difficult decisions.

Regarding the interconnection of software (SW) and hardware (HW) units:

The design of the HW unit is directly coupled to the Overlay model. An HW unit that is able to meet the run-time requirements and constraints of an emergency condition should be able to incorporate all the necessary HW modules in order to perform its dynamic workload on time, according to what the Overlay model dictates. Consequently, the presented example of an HW unit is tailored to the needs of the Overlay model, since an already available, off-the-self HW unit cannot guarantee that the run-time requirements will be satisfied.

The complete Overlay model computation unit introduces a novel HW-SW combination, which conjointly advances the existing resource management paradigms of relevant state-of-the-art embedded processing systems. The Overlay model provides a concise way to map processes and interactions of the physical and external world into information semantically and logically interpretable by a computing system. In this way, the run-time resource management logic of an Overlay computation unit can make decisions based on the actual state of the physical or external system surroundings, instead of only pre-encoded template situations. For example, in case of an emergency it can prioritize the execution of node status propagation routines that are of high priority to the incident, even if it is an unprecedented one. The high priority being driven by the Overlay model from the goal proximity of starting node in a propagation to high level goals. In a normal case of prior art application development, such an event and the relevant actions would be foreseen and designated by the application designer at design time and does not adapt to the situation at hand by using goal proximity of the nodes that are about to be processed which is different at each temporal instance of the enterprise models overall state.

By means of example, for a low priority series of nodes in a propagation, the run time engine is about to run the low priority series of value and state propagations from a start nodes to end nodes. Overlay model software will dynamically compare the low priority series of nodes as to their comparative importance to other processes in the current situation using goal proximity or similar means. The software will then signal the processing hardware to run at a lower than maximum speed so as to preserve energy/power or postponing the run time processing of such a processing job without (practically) impacting normal operation. In another example, an important node reconfiguration (employing updating the entire Overlay model or large part of it) should be taken into account by the software and considered as a "heavy" operation that necessitates all the available processing power. For this reason, the software may signal the hardware to operate at full speed and postpone other less important processing.

In another example the goal proximity of a node propagation increment can be compared to others in the schedule of processing jobs to be executed via the run time program and processor. In this way, the processor can be fed jobs that have a high priority for the enterprise situation at hand and postpone others of low priority as measured by goal proximity. This can assist in processor performance management when processor performance is limited. Similarly goal proximity can be used in energy/power management when energy/power is limited. It should be apparent to a reader of ordinary skill in related art that other combinations and decisions are possible, like also taking into account the available battery power of a portable processing device, the urgency and/importance of an operation/event, etc.

The above exemplary embodiment descriptions are simplified and do not include hardware and software elements that are used in the embodiments but are not part of the current innovative solution, are not needed for the understanding of the embodiments, and are obvious to any user of ordinary skill in related art. Furthermore, variations of the described technique, system architecture, and software architecture are possible, where, for instance, technique steps, and hardware and software elements may be rearranged, omitted, or new added.

Various embodiments of the invention are described above in the Detailed Description. While these descriptions directly describe the above embodiments, it is understood that those skilled in the art may conceive modifications and/or variations (such as addition, deletion, or reordering of process steps, and software and hardware modules) to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description is intended for the purposes of illustration and description. It is not intended to be exhaustive or limit the invention to the precise form disclosed and many modifications and variations are possible in the light of the above disclosure. The embodiments were chosen and described to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

Those of skill in the art would understand that signals may be represented using any of a variety of different techniques. For example, data, software, instructions, signals that may be referenced throughout the above description may be represented by voltages, currents, electromagnetic waves, magnetic fields or particles, light or any combination thereof.

Those of skill would further appreciate that the various illustrative radio frequency or analog circuit blocks described in connection with the disclosure herein may be implemented in a variety of different circuit topologies, on one or more integrated circuits, separate from or in combination with logic circuits and systems while performing the same functions described in the present disclosure.

Those of skill would also further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A domain model computation unit, comprising as a single board computer;
    a semiconductor chip (microprocessor) having both data and software instructions embedded therein as a single model;
    a central processing unit (CPU) configured to process the embedded data and software instructions according to the single model without requiring data retrieval by query from an external data model, the CPU in communication with both a first bus and with a second bus, wherein all communication between the first bus and the second bus is through the CPU;
    the first bus in communication with a plurality of internal modules; and
    the second bus in communication with an input/output (I/O) unit effective to communicate with devices external to the single board computer;
    wherein the internal modules include a kernel non-volatile memory, a working non-volatile memory, a random access memory and an encryption/decryption unit that encrypts and decrypts data exchanged with the devices external to the single board computer;
    further wherein the working non-volatile memory includes more than one domain model, each domain model including a plurality of nodes linked together by one or more paths all converging on one or more goals wherein the goals of each domain model are different.

2. The domain model computation unit of claim 1 wherein the links between nodes contain cause and effect logic that propagates values between the nodes.

3. The domain model computation unit of claim 2 wherein the kernel non-volatile memory includes a microkernel and an operating system effective to communicate with and instruct a domain model.

4. The domain model computation unit of claim 3 wherein the I/O unit communicates with an external server.

5. The domain model computation unit of claim 4 wherein the external server is effective to send upgrade/update instructions to the model kernel and to at least one domain model.

6. The domain model computation unit of claim 5 wherein the upgrade/update instructions are received in encrypted format and directed to the encryption/decryption unit for decryption.

7. The domain model computation unit of claim 4 wherein the random access memory is effective to support the one or more domain modules in the event communication with devices external to the single board computer is lost.

8. A system containing a model of an enterprise, comprising:
    the model of the enterprise split into a plurality of domain models that are distributed among a plurality of domain computation units, each one of said domain models including a plurality of nodes linked together by one or more paths all converging on one or more goals;
    the plurality of domain computation units each having as a single board computer, a central processing unit (CPU) in communication with both a first bus and with a second bus, wherein all communication between the first bus and the second bus is through the CPU, the first bus in communication with a plurality of internal modules, said internal modules including: (a) a kernel non-volatile memory, (b) a working non-volatile memory, (c) a random access memory and (d) an encryption/decryption unit, and the second bus in communication with an input/output (I/O) unit effective to communicate with devices external to the single board computer; and
    a third bus enabling the plurality of domain computation units to communicate with each other.

9. The system of claim 8 wherein the third bus communicates with an external server.

10. The system of claim 9 wherein the external server sends encrypted instructions to one or more of the domain computation units and those instructions are decrypted in that domain computation unit encryption/decryption unit.

11. The system of claim 10 wherein the random access memory of each domain computation unit is effective to support the one or more domain modules in the domain computation unit in the event communication with the server or with others of the domain computation units is lost.

12. The system of claim 10 wherein each single board computer is contained within a different device.

13. The system of claim 12 wherein the different devices are selected from the group consisting of smart phones and tablets.

14. The system of claim 13 wherein in the event of an emergency, the server sends instructions to update the function of select domain computation units and coordinates the function of each device.

15. The system of claim 12 wherein a same domain model is located on different domain model computation units to provide redundancy.

16. The system of claim 12 wherein the third bus is a wireless communication network.

17. A single board computational unit for executing software code modeled in a form embedding data and software instructions in a single model, the single board computational unit comprising:
   a semiconductor chip (microprocessor) having both data and software instructions embedded therein as a single model;
   a central processing unit configured to process the embedded data and software instructions according to an at least one layer of abstraction model without requiring data retrieval by query from an external data model, said single model including nodes associated with context, each node being connected to at least one other node at a same layer of abstraction and links between nodes containing cause and effect logic that propagates values between nodes, wherein the nodes represent status and state of processes;
   a kernel non-volatile memory for storing and limiting access to the central processing unit, said kernel having instructions for interpreting the at least one layer of abstraction model and instructions for synchronizing the at least one layer of abstraction model with a version of the model stored at a remote device;
   an encryption and decryption unit for encrypting and decrypting data exchanged between the single board computational unit and the remote device; and
   a power management unit configured to inform the central processing unit of power status.

18. The single board computational unit of claim 17 wherein the power management unit dynamically implements power management priorities, such that these priorities are a safety mechanism for preserving battery capacity or, in cases of battery capacity below a threshold ensuring that the computational unit will shut-down in a consistent and safe manner, and where the power management priorities are implemented according to at least one of:
   a remaining available energy of the computational unit;
   an amount of processing power and work needed for an operation or series of operations; and
   an enterprise priority of operations of processing by the processor.

19. The single board computational unit of claim 18 wherein a dynamic processing performance management facility manages the run time system prioritization dynamically to provide optimal system processing performance, wherein the dynamic processing performance management facility maintains system processing performance in emergencies or high enterprise risk use according to
   an enterprise priority of operations of the processing by the processor.

20. The single board computational unit of claim 19 wherein the enterprise priority of operations is determined by goal proximity of each prospective processing cluster to goals based on the enterprise situation at hand.

21. The single board computational unit of claim 19 wherein the enterprise priority of operations is determined by an expected processing capacity that will be expended on a prospective node cluster to be processed.

22. The single board computational unit of claim 19 wherein the kernel non-volatile memory includes implementations of nodes, links and propagation models in central processing unit instructions and where the at least one layer of abstraction model is configured to call these implementations for executing the enterprise model.

23. The single board computational unit of claim 22 wherein the kernel non-volatile memory stores a plurality of different operating systems with each operating system associated with a different central processing unit.

24. The single board computational unit of claim 22 wherein the working non-volatile memory stores a plurality of multi-layer abstraction partial models and the plurality of partial models are capable of being executed in parallel.

25. The single board computational unit of claim 22 wherein the dynamic processing prioritization is based on at least one of:
   an available processing power of the processor;
   an amount of processing power and work needed for an operation or series of operations; and
   an enterprise priority of operations of the processing by the processor.

26. The single board computational unit of claim 25 wherein an enterprise priority of operations of processing is determined by goal proximity of each prospective processing cluster to the goals based on the enterprise situation at hand.

27. The single board computational unit of claim 25 wherein an enterprise priority of operations of processing is determined by an expected processing capacity that will be expended on the prospective node cluster to be processed.

28. The single board computational unit of claim 18 wherein the single model of the single board computational unit forms a component of an enterprise model formed by interconnecting the grid of interconnected single board computational units, said enterprise model being configured as an at least one layer of abstraction model.

29. The single board computational unit of claim 28 wherein the central processing unit selects the sequence of nodes on a layer of the at least one layer of abstraction model to execute first based on a prioritization scheme.

30. A grid of computational units that executes software code modeled in a form embedding data and software instructions in a single model, the grid of computational units comprising:
   a plurality of computational units, each computational unit including;
   a central processing unit for processing data according to an at least one layer of abstraction model, the at least one layer of abstraction model having nodes with status and state parameters, where each node is connected to at least one additional node at the same layer of abstraction, the nodes configured to propagate to high level goals with status and state parameters on the same layer of abstraction, nodes in the same layer of abstraction associated with nodes with process status and state parameters on a lower level of abstraction or associated with nodes defined by context at a higher level of abstraction;

a kernel non-volatile memory, with access only to the central processing unit, programmed with instructions to interpret the at least one layer of abstraction model and instructions to synchronize the at least one layer of abstraction model with an enterprise model stored on a remote device;

a working non-volatile memory for storing the at least one layer of abstraction model;

a random access memory for storing data and instructions at runtime;

an encryption and decryption unit for encrypting and decrypting data exchanged with external computational units;

an input-output unit for exchanging data with external computational units; and a power management unit managing power and informing the central processing unit of power status.

31. The grid of computational units of claim 30 wherein the kernel stored in the kernel non-volatile memory includes implementations of nodes, links, propagation models and central processing unit instructions, wherein the at least one layer abstraction model calls these implementations for executing the model.

32. The grid of computational units of claim 31 wherein the kernel non-volatile memory stores a plurality of different operating systems, each said operating system associated with a different central processing unit.

33. The grid of computational units of claim 31 wherein the working non-volatile memory stores a plurality of the at least one layer of abstraction partial models and where the plurality of partial models are executed in parallel.

34. A more than one level of abstraction system comprising:

an Overlay model providing an executing program by organizing a status of node state parameters, organizing location of conversion logic and organizing/locating a storage of data;

a plurality of first nodes, each said first node having a respective attribute and a respective state, and a plurality of first links interconnecting said plurality of first nodes in a source to target relationship to form a first node cluster, each said first link containing software code effective to change the respective attribute of a target node;

a plurality of second nodes, each said second node having a respective attribute and a respective state, and a plurality of second links interconnecting said plurality of second nodes in a source to target relationship to form a second node cluster, each said second link containing software code effective to change the respective attribute of a target node; and one or more third links interconnecting the first node cluster and the second node cluster either in a source target relationship or a direct association relationship wherein the first node cluster is at a higher level of abstraction when compared to the second node cluster;

wherein at least one node of the second node cluster is interconnected to a first predictive pattern module that associates that node with a first external application.

35. The multi-level system of claim 34 wherein node clusters are goal oriented, process oriented and executable.

36. The multi-level system of claim 35 wherein the first external application is located on a device selected from the group consisting of a desktop computing device, a portable computing device, an Internet of Things device and a smart phone.

37. The multi-level system of claim 35 wherein a third node cluster is process oriented and at the same level of abstraction as the second node cluster.

38. The multi-level system of claim 37 wherein at least one node of the third node cluster is interconnected to a second predictive pattern module that associates that node with a second external application.

39. The multi-level system of claim 38 wherein the second external application is located on a device selected from the group consisting of a desktop computing device, a portable computing device, an Internet of Things device and a smart phone.

40. The multi-level system of claim 39 wherein additional node clusters are disposed between the abstraction level of the first node cluster and the abstraction level of the second and third node cluster and have an intermediate level of abstraction.

* * * * *